United States Patent
Tateishi et al.

(10) Patent No.: US 8,038,782 B2
(45) Date of Patent: Oct. 18, 2011

(54) INK COMPOSITION, INKJET RECORDING INK AND INKJET RECORDING METHOD

(75) Inventors: Keiichi Tateishi, Minami-Ashigara (JP); Yoshimitsu Arai, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 198 days.

(21) Appl. No.: 12/440,496

(22) PCT Filed: Oct. 4, 2007

(86) PCT No.: PCT/JP2007/069910
§ 371 (c)(1), (2), (4) Date: Mar. 9, 2009

(87) PCT Pub. No.: WO2008/041783
PCT Pub. Date: Apr. 10, 2008

(65) Prior Publication Data
US 2010/0028539 A1    Feb. 4, 2010

(30) Foreign Application Priority Data
Oct. 4, 2006   (JP) ................................. 2006-272759

(51) Int. Cl.
C09D 11/02 (2006.01)
(52) U.S. Cl. .................................................... 106/31.49
(58) Field of Classification Search ............... 106/31.49; 347/100
See application file for complete search history.

(56) References Cited

U.S. PATENT DOCUMENTS

| | | | | |
|---|---|---|---|---|
| 5,425,805 A * | 6/1995 | Botros et al. | | 106/31.43 |
| 6,156,111 A * | 12/2000 | Schwarz | | 106/31.43 |
| 7,097,701 B2 * | 8/2006 | Tateishi et al. | | 106/31.49 |
| 7,132,012 B2 * | 11/2006 | Tateishi et al. | | 106/31.49 |
| 7,211,134 B2 * | 5/2007 | Tateishi et al. | | 106/31.49 |
| 7,279,033 B2 * | 10/2007 | Yabuki et al. | | 106/31.49 |
| 7,291,213 B2 * | 11/2007 | Ogawa et al. | | 106/31.49 |
| 7,300,503 B2 * | 11/2007 | Tateishi et al. | | 106/31.49 |
| 7,479,178 B2 * | 1/2009 | Dodge et al. | | 106/31.49 |
| 7,708,820 B2 * | 5/2010 | Ogawa | | 106/31.52 |
| 2005/0109236 A1 | 5/2005 | Yabuki et al. | | |
| 2005/0142306 A1 * | 6/2005 | Uhlir-Tsang et al. | | 106/31.49 |
| 2006/0065156 A1 | 3/2006 | Ogawa et al. | | |
| 2009/0269496 A1 * | 10/2009 | Tateishi et al. | | 427/256 |
| 2010/0028539 A1 * | 2/2010 | Tateishi et al. | | 106/31.49 |
| 2010/0075040 A1 * | 3/2010 | Tateishi et al. | | 106/31.49 |

FOREIGN PATENT DOCUMENTS

| | | |
|---|---|---|
| EP | 1 514 913 A1 | 3/2005 |
| EP | 1 630 212 A1 | 3/2006 |
| JP | 8-25575 A | 2/1994 |
| JP | 6-228476 A | 8/1994 |
| JP | 6-248212 A | 9/1994 |
| JP | 7-26178 A | 1/1995 |
| JP | 7-228810 A | 8/1995 |
| JP | 7-268261 A | 10/1995 |
| JP | 8-259865 A | 10/1996 |
| JP | 8-337745 A | 12/1996 |
| JP | 9-12946 A | 1/1997 |
| JP | 9-12949 A | 1/1997 |
| JP | 2005-105261 A | 4/2005 |
| JP | 2006-89730 A | 4/2006 |
| JP | 2006-89731 A | 4/2006 |
| JP | 2006-89732 A | 4/2006 |
| JP | 2006-89733 A | 4/2006 |

OTHER PUBLICATIONS

International Search Report (PCT/ISA/210) dated Dec. 17, 2007.
Written Opinion of the International Searching Authority (PCT/ISA/237) dated Dec. 17, 2007.

* cited by examiner

*Primary Examiner* — Helene Klemanski
(74) *Attorney, Agent, or Firm* — Buchanan Ingersoll & Rooney PC

(57) ABSTRACT

An ink composition includes a colorant represented by the following formula (I); water; a guanidine-based compound; and a colorless water-soluble planar compound having more than ten delocalized π-electrons within one molecule:

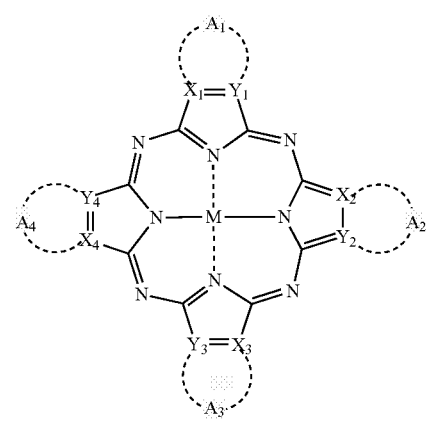

Formula (I)

wherein the symbols in the formula (I) are defined in the specification.

20 Claims, No Drawings

INK COMPOSITION, INKJET RECORDING INK AND INKJET RECORDING METHOD

TECHNICAL FIELD

The present invention relates to an ink composition containing a water-soluble aromatic compound having an excellent effect on the improvement of the bronze phenomenon of the recorded image and a guanidine-based compound having an excellent effect on the storage durability, particularly, gas resistance, of the recorded image, an inkjet recording ink, an inkjet recording method, and a method for improving both the bronze phenomenon of the inkjet recorded image and the storage stability of the inkjet recorded image at the same time.

BACKGROUND ART

The inkjet recording method is abruptly overspread and still making a progress, because the material cost is low, high-speed recording can be performed, noises are less generated at the recording and color recording is easy. The inkjet recording method includes a continuous system of continuously flying a liquid droplet and an on-demand system of flying a liquid droplet according to image information signals, and the ejection system therefor includes a system of ejecting a liquid droplet by applying a pressure from a piezoelectric element, a system of ejecting a liquid droplet by generating a bubble in the ink under heat, a system using an ultrasonic wave, and a system of suctioning and ejecting a liquid droplet by an electrostatic force. As for the inkjet recording ink, an aqueous ink, an oil-based ink or a solid (fusion-type) ink is used.

The coloring matter used in such an inkjet recording ink is required to exhibit good solubility in a solvent such as water, enable high-density recording, provide a good color hue, be fast to light, heat and active gases in the environment (for example, an oxidative gas such as NOx and ozone, and SOx) and highly resistant against water and chemicals, ensure good fixing property and less blurring on an image-receiving material, give an ink having excellent storability, have high purity and no toxicity and be available at a low cost.

Above all, the coloring matter is strongly demanded to be fast to light, humidity and heat, particularly, at the printing on an image-receiving material having an ink-receiving layer containing a porous white inorganic pigment particle, to be fast to oxidative gases such as ozone in the environment and excellent in the water resistance.

On the other hand, in the case where a recorded image having a high optical density is formed, it is known that there arises a problem that as the image is dried, the coloring matter crystal deposits on the surface of the recording material and the recorded image reflects light to cause a so-called bronze phenomenon of emitting metallic gloss. This phenomenon tends to readily occur when the water solubility of the coloring matter is decreased so as to improve water resistance, light resistance or gas resistance or a hydrogen bonding group is introduced into the coloring matter structure. The generation of the bronze phenomenon not only incurs decrease in the optical density of the recorded image but also causes the recorded image to have a color hue greatly different from the desired color hue or lose the transparency. Therefore, it is one of important performances required of the inkjet ink to prevent the bronze phenomenon.

As regards the method for preventing the bronze phenomenon, there have been heretofore known a method of adding a specific nitrogen-containing compound (see, for example, JP-A-6-25575 (the term "JP-A" as used herein means an "unexamined published Japanese patent application"), JP-A-6-228476, JP-A-6-248212, JP-A-7-228810, JP-A-7-268261, JP-A-9-12946 and JP-A-9-12949), a method of adding a specific heterocyclic compound (see, JP-A-8-259865), a method of adding a specific titanium compound (see, JP-A-8-337745), a method of adding an alkali metal ion (see, JP-A-7-26178), and the like. The bronze phenomenon may be prevented from occurring by adding such an additive, but the amount of the additive added may be increased because of its insufficient effect or the additive may decrease various performances of the ink and the quality of the recorded image, such as deterioration in the storage stability. For example, as described in JP-A-8-259865, when an alkanolamine is added to the ink, the bronze phenomenon can be prevented, but by the addition only in a small amount, the pH of the ink increases to 11 or more and the high pH ink not only adversely affects nozzles but also lacks in safety on erroneously contacting with a human body and moreover, decreases the printing grade or water resistance of the recorded image.

In this way, various effects can be obtained by using an additive, but it is difficult to use conventional additives while maintaining various performances. Particularly, in the case where the solubility and aggregating property of the coloring matter need to be taken account of, selection of the kind and amount of the additive is difficult. Also, in using an ionic additive, the effect thereof on the counter ion must also be taken into consideration. Accordingly, a molecular design of the additive by an unconventional new idea and a substantial bronze phenomenon-inhibiting method using the additive are being demanded.

As regards the method for improving such bronze gloss of the recorded image, there are disclosed a method of using a specific additive in combination (see, for example, JP-A-2005-105261), and a method for adding a specific additive in combination for improving the storage stability (particularly, light fastness and ozone gas fastness) of the recorded image (see, for example, JP-A-2006-89730, JP-A-2006-89731, JP-A-2006-89732 and JP-A-2006-89733). However, a method satisfying both the improvement of bronze phenomenon of the recorded image and the improvement of preservability of the recorded image at the same time in a high improvement level has not yet been found, and a method for more improvement is being demanded at present.

DISCLOSURE OF THE INVENTION

The objects of the present invention are (1) to provide a novel ink having absorption properties ensuring excellent color reproduction and at the same time, having sufficiently high fastness to light, heat, humidity and active gas in the environment;

(2) to provide an ink of giving a colored image or colored material excellent in the color hue and fastness, for example, a printing ink composition used in the inkjet recording;

(3) to provide an inkjet recording ink and an inkjet recording method, which can form an image assured of good color hue by the use of a phthalocyanine compound derivative having a specific structure as the colorant, high fastness to light and active gas in the environment, particularly ozone gas, and excellent water resistance and free of generation of a bronze phenomenon; and (4) to provide a method satisfying the improvement of both bronze phenomenon and preservability of the image recorded matter at the same time in a high improvement level by using the above-described inkjet recording method.

The objects of the present invention can be attained by the following inventions.

<1> An ink composition comprising:
a colorant represented by the following formula (I);
water;
a guanidine-based compound; and
a colorless water-soluble planar compound having more than ten delocalized π-electrons within one molecule:

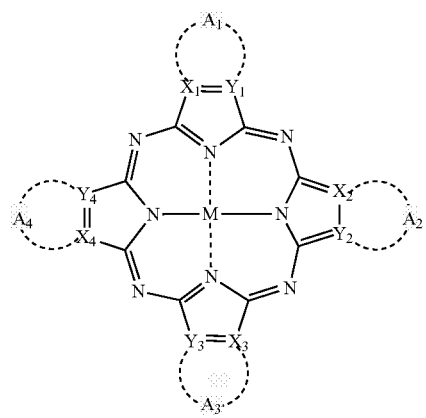

Formula (I)

wherein
each of $X_m$ (m=1, 2, 3, 4) represents a carbon atom or a nitrogen atom;
each of $Y_m$ (m=1, 2, 3, 4) represents a carbon atom or a nitrogen atom;
each of $A_m$ (m=1, 2, 3, 4) represents a group necessary for forming, together with $X_m$ and $Y_m$, either an aromatic hydrocarbon ring which may further form a condensed ring with another ring or a hetero ring which may further form a condensed ring with another ring;
each of $A_m$ may have a substituent;
each of the substituents of $A_m$ may further have a substituent;
at least one of the substituents of $A_m$ and the substituents of the substituents of $A_m$ is ionic hydrophilic group; and
M represents a hydrogen atom, a metal element, a metal oxide, a metal hydroxide or a metal halide,
provided that the following conditions are satisfied:
(i) at least one of the four rings, each of which comprises respective $A_m$, $X_m$ and $Y_m$, is a hetero ring;
(ii) when all of the four rings, each of which comprises respective $A_m$, $X_m$ and $Y_m$, are a pyridine ring, both of atoms adjacent to $X_m$ and $Y_m$ in each pyridine ring are a carbon atom; and
(iii) when all of the four rings, each of which comprises respective $A_m$, $X_m$ and $Y_m$, are a pyrazine ring, both of atoms adjacent to $X_m$ and $Y_m$ in each pyrazine ring are a carbon atom.

<2> The ink composition as described in <1>, wherein the colorant represented by the formula (I) is represented by the following formula (II):

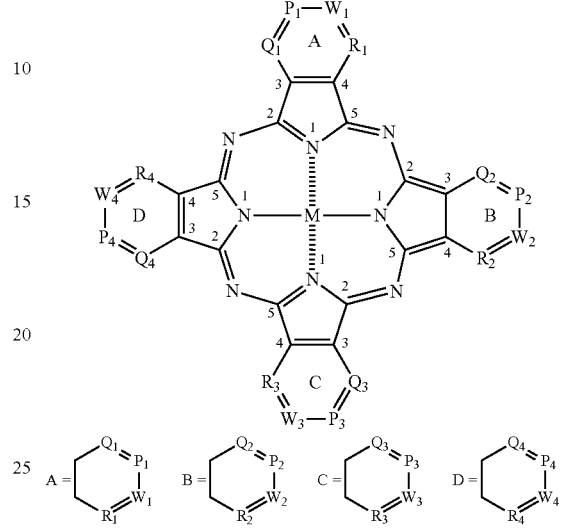

Formula (II)

wherein
each of $Q_m$ (m=1, 2, 3, 4) represents =C($J_1$)- or —N=;
each of $P_m$ (m=1, 2, 3, 4) represents =C($J_2$)- or —N=;
each of $W_m$ (m=1, 2, 3, 4) represents =C($J_3$)- or —N=;
each of $R_m$ (m=1, 2, 3, 4) represents =C($J_4$)- or —N=,
each of $J_n$ (n=1, 2, 3, 4) represents a hydrogen atom or a substituent, and when each of $J_n$ represents a substituent, each of $J_n$ may further have a substituent;
at least one of $J_n$ and the substituents of $J_n$ is an ionic hydrophilic group; and
M represents a hydrogen atom, a metal element, a metal oxide, a metal hydroxide or a metal halide,
provided that the following conditions are satisfied:
(i) at least one of the four rings (A), (B), (C) and (D), in which the ring (A) comprises $Q_1$, $P_1$, $W_1$ and $R_1$, the ring (B) comprises $Q_2$, $P_2$, $W_2$ and $R_2$, the ring (C) comprises $Q_3$, $P_3$, $W_3$ and $R_3$, and the ring (D) comprises $Q_4$, $P_4$, $W_4$ and $R_4$, is a hetero ring;
(ii) when all of the four rings (A), (B), (C) and (D) are a pyridine ring, both of $Q_m$ and $R_m$ in each pyridine ring are a carbon atom; and
(iii) at least one of the four rings (A), (B), (C) and (D) is not a pyrazine ring.

<3> The ink composition as described in <2>, wherein
at least one of the four rings (A), (B), (C) and (D) represents an aromatic hydrocarbon ring; and
at least one of the four rings (A), (B), (C) and (D) represents a pyridine ring or a pyrazine ring.

<4> The ink composition as described in <2> or <3>, wherein
at least one of the four rings (A), (B), (C) and (D) represents an aromatic hydrocarbon ring represented by the following formula (IV):

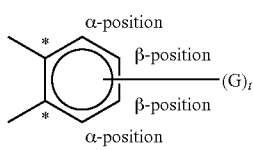

Formula (IV)

wherein

\* represents a position at which the ring is bonded to the 3- and 4-positions of the 5-membered nitrogen-containing ring to form the phthalocyanine structure;

the position closer to \* in the aromatic hydrocarbon ring is called α-position;

the position farther from \* in the aromatic hydrocarbon ring is called β-position;

the position to which G(s) is substituted is not specified as either the α-position or the β-position;

each of G(s) represents a substituent selected from the group consisting of —SO—Z, —SO$_2$—Z, —SO$_2$NV$_1$V$_2$, —CONV$_1$V$_2$, —CO$_2$Z, —COZ, a sulfo group and a salt thereof, a carboxyl group and a salt thereof, and a phosphono group and a salt thereof;

t represents an integer of 1 to 4;

Z(s) may be the same as or different from each other, and each of Z(s) represents a substituted or unsubstituted alkyl group having a total carbon number of 1 to 20, a substituted or unsubstituted cycloalkyl group having a total carbon number of 3 to 20, a substituted or unsubstituted alkenyl group having a total carbon number of 2 to 20, a substituted or unsubstituted alkynyl group having a total carbon number of 2 to 12, a substituted or unsubstituted aryl group having a total carbon number of 6 to 20, or a substituted or unsubstituted heterocyclic group having a total carbon number of 4 to 20;

V$_1$(s) may be the same as or different from each other, and each of V$_1$(s) represents a hydrogen atom, a substituted or unsubstituted alkyl group having a total carbon number of 1 to 20, a substituted or unsubstituted cycloalkyl group having a total carbon number of 3 to 20, a substituted or unsubstituted alkenyl group having a total carbon number of 2 to 20, a substituted or unsubstituted alkynyl group having a total carbon number of 2 to 12, a substituted or unsubstituted aralkyl group having a total carbon number of 7 to 20, a substituted or unsubstituted aryl group having a total carbon number of 6 to 20, or a substituted or unsubstituted heterocyclic group having a total carbon number of 4 to 20; and V$_2$(s) may be the same as or different from each other, and each of V$_2$(s) represents a hydrogen atom, a substituted or unsubstituted alkyl group having a total carbon number of 1 to 20, a substituted or unsubstituted cycloalkyl group having a total carbon number of 3 to 20, a substituted or unsubstituted alkenyl group having a total carbon number of 2 to 20, a substituted or unsubstituted alkynyl group having a total carbon number of 2 to 12, a substituted or unsubstituted aralkyl group having a total carbon number of 7 to 20, a substituted or unsubstituted aryl group having a total carbon number of 6 to 20, or a substituted or unsubstituted heterocyclic group having a total carbon number of 4 to 20.

<5> The ink composition as described in <3> or <4>, wherein at least one of the four rings (A), (B), (C) and (D) represents an aromatic hydrocarbon ring represented by the following formula (V):

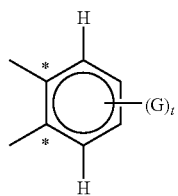

Formula (V)

wherein

G(s) has the same meaning as in the formula (IV);

t represents an integer of 0 to 2; and

\* represents a position at which the ring is bonded to the 3- and 4-positions of the 5-membered nitrogen-containing ring to form the phthalocyanine structure.

<6> The ink composition as described in any one of <2> to <5>, wherein at least one of the four rings (A), (B), (C) and (D) represents an aromatic hydrocarbon ring represented by the formula (V); and at least one of the four rings (A), (B), (C) and (D) represents a pyridine ring.

<7> The ink composition as described in any one of <2> to <6>, wherein at least one of the four rings (A), (B), (C) and (D) represents an aromatic hydrocarbon ring represented by the formula (V); and at least one of the four rings (A), (B), (C) and (D) represents a pyridine ring represented by formula (VI):

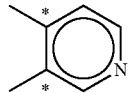

Formula (VI)

wherein

\* represents a position at which the ring is bonded to the 3- and 4-positions of the 5-membered nitrogen-containing ring to form the phthalocyanine structure.

<8> The ink composition as described in any one of <2> to <7>, wherein at least one of the four rings (A), (B), (C) and (D) represents an aromatic hydrocarbon ring represented by the following formula (VII); and at least one of the four rings (A), (B), (C) and (D) represents a pyridine ring represented by the formula (VI):

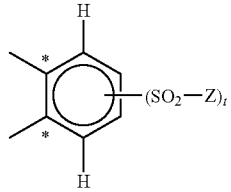

Formula (VII)

wherein

G(s) has the same meaning as in the formula (IV), t represents an integer of 0 to 2; and \* represents a position at which the ring is bonded to the 3- and 4-positions of the 5-membered nitrogen-containing ring to form the phthalocyanine structure.

<9> The ink composition as described in any one of <1> to <8>, wherein
the water-soluble planar compound has at least two aromatic rings.

<10> The ink composition as described in any one of <1> to <9>, wherein
the water-soluble planar compound has no fluorescence, and has 350 nm or less of λmax and 10,000 or less of molar absorption coefficient, wherein
λmax represents a wavelength of the absorption peak having the longest wavelength.

<11> The ink composition as described in any one of <1> to <10>, wherein
the water-soluble planar compound has a sulfo group.

<12> The ink composition as described in any one of <1> to <12>, wherein
the guanidine-based compound is represented by the following formula (1):

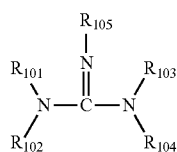

Formula (1)

wherein
$R_{101}$, $R_{102}$, $R_{103}$ and $R_{104}$ each independently represents a hydrogen atom, a substituted or unsubstituted alkyl group, a substituted or unsubstituted alkoxy group, a substituted or unsubstituted aryl group, a substituted or unsubstituted heterocyclic group, or substituted or unsubstituted an amino group; and
$R_{105}$ represents a hydrogen atom, a substituted or unsubstituted alkyl group, a substituted or unsubstituted alkoxy group, a substituted or unsubstituted aryl group, or a substituted or unsubstituted heterocyclic group.

<13> The ink composition as described in any one of <1> to <12>, wherein
the guanidine-based compound is in an amount of 0.1 to 10 mass % based on the ink composition.

<14> The ink composition as described in any one of <1> to <13>, further comprising:
a surfactant.

<15> The ink composition as described in <14>, wherein
the surfactant is in an amount of 0.05 to 50 g/liter based on the ink composition.

<16> The ink composition as described in <14> or <15>, wherein
the surfactant is a nonionic surfactant.

<17> The ink composition as described in <16>, wherein
the nonionic surfactant is an acetylene glycol-based surfactant.

<18> The ink composition as described in any one of <1> to <17>, further comprising:
an antiseptic.

<19> An inkjet recording ink prepared by using the ink composition as described in any one of <1> to <18>.

<20> An inkjet recording method using the inkjet recording ink as described in <19>.

BEST MODE FOR CARRYING OUT THE INVENTION

The present invention is based on the finding that when a colorant having a specific structure represented by formula (I) and a specific compound are present together, the preservability, particularly, ozone resistance, of an image can be remarkably enhanced. As well as enhancement of the ozone resistance, an image quality free of bronze gloss, bleeding or beading can also be ensured.

The constituent elements of the present invention are described in detail below.
(Colorant Represented by Formula (I) or (II))

The colorant for use in the present invention is a phthalocyanine derivative having a specific structure (a specific number of specific substituents are introduced into specific substitution sites), and it has been found that by virtue of using this colorant, the preservability, particularly, ozone gas resistant fastness, of the recorded image can be greatly enhanced.

That is, the phthalocyanine derivative having a specific structure, which is the colorant for use in the present invention represented by formula (I) or (II), is greatly characterized by controlling the position of the substituent at the molecular synthesis to have at least one nitrogen-containing hetero ring (preferably at least one nitrogen-containing hetero ring and at least one aromatic hydrocarbon ring) in the phthalocyanine structure.

The phthalocyanine derivative as the colorant for use in the present invention preferably has at least one nitrogen-containing hetero ring in the phthalocyanine mother nucleus and an aromatic hydrocarbon ring having a specific number of specific substituents only at the β-position. This construction is considered to provide an effect of promoting the aggregation of the phthalocyanine derivative and at the same time, enhancing the oxidation potential, thereby ensuring excellent weather resistance (light fastness, gas resistance).

The colorant for use in the present invention is preferably a phthalocyanine derivative having a structure represented by the following formula (I).

The colorant represented by formula (I) or (II) for use in the present invention includes a sole phthalocyanine derivative (dye) represented by formula (I) or (II), a salt or hydrate thereof, and a dye mixture or a salt or hydrate thereof. The salts or hydrates may be used individually or as a mixture in the colorant.

Formula (I):

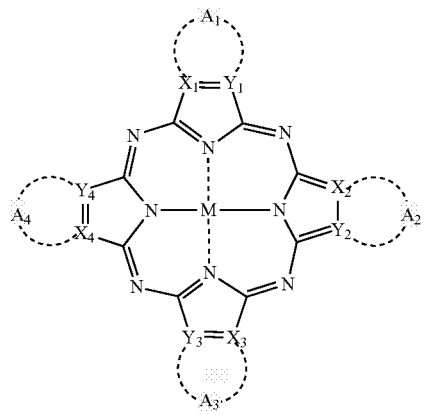

In formula (I), M represents a hydrogen atom, a metal element, or its oxide, hydroxide or halide.
Examples of the metal atom include Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi.
Examples of the oxide include VO and GeO.

Examples of the hydroxide include $Si(OH)_2$, $Cr(OH)_2$ and $Sn(OH)_2$.

Examples of the halide include AlCl, $SiCl_2$, VCl, $VCl_2$, VOCl, FeCl, GaCl and ZrCl.

Above all, M is preferably Cu, Ni, Zn, Al or the like, and most preferably Cu.

In formula (I), $X_1$ to $X_4$ and $Y_1$ to $Y_4$ each is independently, preferably a carbon atom or a nitrogen atom. The bond $X_1$—$Y_1$, $X_2$—$Y_2$, $X_3$—$Y_3$ or $X_4$—$Y_4$ may be a single bond or a double bond according to respective atom species or the hetero ring species of $A_1$ to $A_4$.

In formula (I), $A_1$ to $A_4$ each independently represents a group necessary for forming an aromatic hydrocarbon ring or hetero ring (may further form a condensed ring with another ring) together with $X_1$ to $X_4$ and $Y_1$ to $Y_4$.

Unless specifically denoted otherwise, the aromatic hydrocarbon ring indicates an aromatic ring where the atom constituting the ring is only a carbon atom, and specifically includes a benzene ring. The aromatic hydrocarbon ring may be further condensed with another aromatic ring, a hetero ring or an aliphatic ring.

In the case of forming a hetero ring, the group is preferably composed of at least two kinds selected from a carbon atom, a nitrogen atom, a sulfur atom, and an oxygen atom.

Among the hetero rings composed of $A_1$ to $A_4$, $X_1$ to $X_4$ and $Y_1$ to $Y_4$, a 5- or 6-membered hetero ring is preferred.

Preferred examples of the hetero ring composed of $A_1$ to $A_4$, $X_1$ to $X_4$ and $Y_1$ to $Y_4$ include pyridine, pyrazine, imidazole, pyrazole, thiazole, isothiazole, oxazole, pyrrole, pyrazolone, indole, isoxazole, thiophene, furan, pyran, penthiophene, quinoline, isoquinoline, pyridazine, pyrimidine and pyridone. However, four rings each comprising A, X and Y all are not an aromatic ring at the same time. Also, when four rings each comprising A, X and Y all are a pyridine ring at the same time, a pyridine ring where either one of the atoms adjacent to of X and Y in the pyridine ring is a nitrogen atom is excluded. Furthermore, when four rings each comprising A, X and Y all are a pyrazine ring at the same time, a pyrazine ring where both of the atoms adjacent to X and Y in the pyrazine ring are a nitrogen atom is excluded.

$A_1$ to $A_4$ each may have a substituent. The substituent is preferably a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group (acylamino group), an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a sulfinyl group, a phosphoryl group, an acyl group or an ionic hydrophilic group. These groups each may further have a substituent.

Among these groups, a halogen atom, an alkyl group, a cycloalkyl group, an alkenyl group, an aralkyl group, an aryl group, a heterocyclic group, a cyano group, an alkoxy group, an amido group, a ureido group, a sulfonamido group, a carbamoyl group, a sulfamoyl group, a sulfonyl group, an alkoxycarbonyl group and an ionic hydrophilic group are more preferred, a halogen atom, an alkyl group, a cycloalkyl group, an alkenyl group, an aralkyl group, an aryl group, a heterocyclic group, a cyano group, a carbamoyl group, a sulfamoyl group, a sulfonyl group, an alkoxycarbonyl group and an ionic hydrophilic group are still more preferred, and a sulfamoyl group, a sulfonyl group and an ionic hydrophilic group are most preferred.

At least one of $A_1$ to $A_4$ or at least one of the substituents of $A_1$ to $A_4$ has an ionic hydrophilic group as a substituent.

Examples of the ionic hydrophilic group as the substituent include a sulfo group, a carboxyl group, a phosphono group and a quaternary ammonium group. The ionic hydrophilic group is preferably a carboxyl group or a sulfo group, more preferably a sulfo group.

The carboxyl group, phosphono group and sulfo group each may be in the state of a salt. Examples of the counter ion forming the salt include an alkali metal ion (e.g., lithium ion, sodium ion, potassium ion) and an organic cation (e.g., tetramethylguanidium ion).

The alkyl group as the substituent which $A_1$ to $A_4$ may have includes an alkyl group having a substituent and an unsubstituted alkyl group. The alkyl group is preferably an alkyl group having a carbon number of 1 to 20 excluding a substituent, more preferably an alkyl group having a carbon number of 1 to 12. In view of solubility, the alkyl group is still more preferably a linear alkyl group and/or a branched alkyl group each having a carbon number of 1 to 8, yet still more preferably an alkyl group having an asymmetric carbon (use in the racemic form). Examples of the substituent include a hydroxyl group, an alkoxy group, a cyano group, a halogen atom and an ionic hydrophilic group. Examples of the alkyl group include methyl, ethyl, butyl, isopropyl, tert-butyl, hydroxyethyl, methoxyethyl, cyanoethyl, trifluoromethyl, 3-sulfopropyl and 4-sulfobutyl. Other examples of the alkyl group include an alkyl group substituted by a substituent which $A_1$ to $A_4$ may have, such as aryl group, and a substituted sulfamoyl group-substituted alkyl group substituted by a sulfamoyl group.

The cycloalkyl group as the substituent which $A_1$ to $A_4$ may have includes a cycloalkyl group having a substituent and an unsubstituted cycloalkyl group. The cycloalkyl group is preferably a cycloalkyl group having a carbon number of 3 to 20 excluding a substituent, more preferably a cycloalkyl group having a carbon number of 5 to 12. In view of solubility, the cycloalkyl group is still more preferably a branched cycloalkyl group having a carbon number of 4 to 8, yet still more preferably a cycloalkyl group having an asymmetric carbon (use in the racemic form). Examples of the substituent include an ionic hydrophilic group. Examples of the cycloalkyl group include a cyclohexyl group.

The alkenyl group as the substituent which $A_1$ to $A_4$ may have includes an alkenyl group having a substituent and an unsubstituted alkenyl group. The alkenyl group is preferably an alkenyl group having a carbon number of 2 to 20 excluding a substituent, more preferably an alkenyl group having a carbon number of 2 to 12. In view of solubility, the alkenyl group is still more preferably a branched alkenyl group having a carbon number of 3 to 12, yet still more preferably an alkenyl group having an asymmetric carbon (use in the racemic form). Examples of the substituent include an ionic hydrophilic group. Examples of the alkenyl group include a vinyl group and an allyl group.

The alkynyl group as the substituent which $A_1$ to $A_4$ may have includes an alkynyl group having a substituent and an unsubstituted alkynyl group. The alkynyl group is preferably an alkynyl group having a carbon member of 2 to 20 excluding a substituent, more preferably an alkynyl group having a carbon number of 2 to 12. In view of solubility, the alkynyl group is still more preferably a branched alkynyl group having a carbon number of 4 to 12, yet still more preferably an alkynyl group having an asymmetric carbon (use in the racemic form). Examples of the substituent include an ionic hydrophilic group.

The aralkyl group as the substituent which $A_1$ to $A_4$ may have includes an aralkyl group having a substituent and an unsubstituted aralkyl group. The aralkyl group is preferably an aralkyl group having a carbon number of 7 to 20 excluding a substituent, more preferably an aralkyl group having a carbon number of 7 to 12. In view of solubility, the aralkyl group is still more preferably a branched aralkyl group having a carbon number of 9 to 12, yet still more preferably an aralkyl group having an asymmetric carbon (use in the racemic form). Examples of the substituent include an ionic hydrophilic group. Examples of the aralkyl group include a benzyl group and a 2-phenethyl group.

The aryl group as the substituent which $A_1$ to $A_4$ may have includes an aryl group having a substituent and an unsubstituted aryl group. The aryl group is preferably an aryl group having a carbon number of 6 to 40, more preferably an aryl group having a carbon number of 6 to 12. In view of solubility, the aryl group is still more preferably a branched aryl group having a carbon number of 7 to 12, yet still more preferably an aryl group an asymmetric carbon (use in the racemic form). Examples of the substituent include an alkyl group, an alkoxy group, a halogen atom, an alkylamino group and an ionic hydrophilic group. Examples of the aryl group include phenyl, p-tolyl, p-methoxyphenyl, o-chlorophenyl, m-(3-sulfopropylamino)phenyl and m-sulfophenyl.

The heterocyclic group as the substituent which $A_1$ to $A_4$ may have includes a heterocyclic group having a substituent and an unsubstituted heterocyclic group and may further form a condensed ring with another ring. The heterocyclic group is preferably a 5- or 6-membered heterocyclic group. Also, the heterocyclic group may be an aromatic heterocyclic group or a non-aromatic heterocyclic group.

Examples of the heterocyclic group represented by $A_1$ to $A_4$ (for example, pyridine can be substituted at the 2-position, 3-position or 4-position) include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazoline and thiazoline.

Among these, preferred is an aromatic heterocyclic group. Preferred examples thereof include, as denoted in the same manner as above, pyridine, pyrazine, pyrimidine, pyridazine, triazine, pyrazole, imidazole, benzimidazole, triazole, thiazole, benzothiazole, isothiazole, benzisothiazole and thiadiazole.

The halogen atom as the substituent which $A_1$ to $A_4$ may have includes a fluorine atom, a chlorine atom and a bromine atom.

The alkylamino group as the substituent which $A_1$ to $A_4$ may have includes an alkylamino group having a substituent and an unsubstituted alkylamino group. The alkylamino group is preferably an alkylamino group having a carbon number of 1 to 6 excluding a substituent. Examples of the substituent include an ionic hydrophilic group. Examples of the alkylamino group include a methylamino group and a diethylamino group.

The alkyloxy group (alkoxy group) as the substituent which $A_1$ to $A_4$ may have includes an alkyloxy group having a substituent and an unsubstituted alkyloxy group. The alkyloxy group is preferably an alkyloxy group having a carbon number of 1 to 12 excluding a substituent. Examples of the substituent include an alkyloxy group, a hydroxyl group and an ionic hydrophilic group. Examples of the alkyloxy group include a methoxy group, an ethoxy group, an isopropoxy group, a methoxyethoxy group, a hydroxyethoxy group and a 3-carboxypropoxy group.

The aryloxy group as the substituent which $A_1$ to $A_4$ may have includes an aryloxy group having a substituent and an unsubstituted aryloxy group. The aryloxy group is preferably an aryloxy group having a carbon number of 6 to 30. Examples of the substituent include an alkoxy group and an ionic hydrophilic group. Examples of the aryloxy group include a phenoxy group, a p-methoxyphenoxy group and an o-methoxyphenoxy group.

The acylamino (amido) group as the substituent which $A_1$ to $A_4$ may have includes an amido group having a substituent and an unsubstituted amido group. The acylamino group is preferably an acylamino group having a carbon number of 2 to 12 excluding a substituent. Examples of the substituent include an ionic hydrophilic group. Examples of the acylamino group include an acetamido group, a propionamido group, a benzamido group and a 3,5-disulfobenzamido group.

The arylamino group as the substituent which $A_1$ to $A_4$ may have includes an arylamino group having a substituent and an unsubstituted arylamino group. The arylamino group is preferably an arylamino group having a carbon number of 6 to 30. Examples of the substituent include a halogen atom and an ionic hydrophilic group. Examples of the arylamino group include an anilino group and a 2-chloroanilino group.

The ureido group as the substituent which $A_1$ to $A_4$ may have includes a ureido group having a substituent and an unsubstituted ureido group. The ureido group is preferably a ureido group having a carbon number of 1 to 12 excluding a substituent. Examples of the substituent include an alkyl group and an aryl group. Examples of the ureido group include a 3-methylureido group, a 3,3-dimethylureido group and a 3-phenylureido group.

The sulfamoylamino group as the substituent which $A_1$ to $A_4$ may have includes a sulfamoylamino group having a substituent and an unsubstituted sulfamoylamino group. Examples of the substituent include an alkyl group. Examples of the sulfamoylamino group include an N,N-dipropylsulfamoylamino group.

The alkylthio group as the substituent which $A_1$ to $A_4$ may have includes an alkylthio group having a substituent and an unsubstituted alkylthio group. The alkylthio group is preferably an alkylthio group having a carbon number of 1 to 12 excluding a substituent. Examples of the substituent include an ionic hydrophilic group. Examples of the alkylthio group include a methylthio group and an ethylthio group.

The arylthio group as the substituent which $A_1$ to $A_4$ may have includes an arylthio group having a substituent and an unsubstituted arylthio group. The arylthio group is preferably an arylthio group having a carbon number of 6 to 30. Examples of the substituent include an alkyl group and an ionic hydrophilic group. Examples of the arylthio group include a phenylthio group and a p-tolylthio group.

The alkyloxycarbonylamino group as the substituent which $A_1$ to $A_4$ may have includes an alkyloxycarbonylamino group having a substituent and an unsubstituted alkyloxycarbonylamino group. The alkyloxycarbonylamino group is preferably an alkyloxycarbonylamino group having a carbon number of 2 to 12 excluding a substituent. Examples of the substituent include an ionic hydrophilic group. Examples of the alkyloxycarbonylamino group include an ethoxycarbonylamino group.

The sulfonamido group as the substituent which $A_1$ to $A_4$ may have includes a sulfonamido group having a substituent and an unsubstituted sulfonamido group. The sulfonamido group is preferably a sulfonamido group having a carbon number of 1 to 12 excluding a substituent. Examples of the substituent include an ionic hydrophilic group. Examples of the sulfonamido group include methanesulfonamido, benzenesulfonamido and 3-carboxybenzenesulfonamido.

The carbamoyl group as the substituent which $A_1$ to $A_4$ may have includes a carbamoyl group having a substituent and an unsubstituted carbamoyl group. Examples of the substituent include an alkyl group. Examples of the carbamoyl group include a methylcarbamoyl group and a dimethylcarbamoyl group.

The sulfamoyl group as the substituent which $A_1$ to $A_4$ may have includes a sulfamoyl group having a substituent and an unsubstituted sulfamoyl group. Examples of the substituent include an alkyl group and an aryl group. Examples of the sulfamoyl group include a dimethylsulfamoyl group, a di(2-hydroxyethyl)sulfamoyl group and a phenylsulfamoyl group.

The sulfonyl group as the substituent which $A_1$ to $A_4$ may have includes an alkylsulfonyl group and an arylsulfonyl group. Examples of the sulfonyl group include a 3-sulfopropylsulfonyl group and a 3-carboxypropylsulfonyl group.

The alkoxycarbonyl group as the substituent which $A_1$ to $A_4$ may have includes an alkoxycarbonyl group having a substituent and an unsubstituted alkoxycarbonyl group. The alkoxycarbonyl group is preferably an alkoxycarbonyl group having a carbon number of 2 to 12 excluding a substituent. Examples of the substituent include an ionic hydrophilic group. Examples of the alkoxycarbonyl group include a methoxycarbonyl group and an ethoxycarbonyl group.

The heterocyclic oxy group as the substituent which $A_1$ to $A_4$ may have includes a heterocyclic oxy group having a substituent and an unsubstituted heterocyclic oxy group. The heterocyclic oxy group is preferably a heterocyclic oxy group having a 5- or 6-membered hetero ring. Examples of the substituent include a hydroxyl group and an ionic hydrophilic group. Examples of the heterocyclic oxy group include a 2-tetrahydropyranyloxy group.

The azo group as the substituent which $A_1$ to $A_4$ may have includes an azo group having a substituent and an unsubstituted azo group. Examples of the azo group include a p-nitrophenylazo group.

The acyloxy group as the substituent which $A_1$ to $A_4$ may have includes an acyloxy group having a substituent and an unsubstituted acyloxy group. The acyloxy group is preferably an acyloxy group having a carbon number of 1 to 12 excluding a substituent. Examples of the substituent include an ionic hydrophilic group. Examples of the acyloxy group include an acetoxy group and a benzoyloxy group.

The carbamoyloxy group as the substituent which $A_1$ to $A_4$ may have includes a carbamoyloxy group having a substituent and an unsubstituted carbamoyloxy group. Examples of the substituent include an alkyl group. Examples of the carbamoyloxy group include an N-methylcarbamoyloxy group.

The silyloxy group as the substituent which $A_1$ to $A_4$ may have includes a silyloxy group having a substituent and an unsubstituted silyloxy group. Examples of the substituent include an alkyl group. Examples of the silyloxy group include a trimethylsilyloxy group.

The aryloxycarbonyl group as the substituent which $A_1$ to $A_4$ may have includes an aryloxycarbonyl group having a substituent and an unsubstituted aryloxycarbonyl group. The aryloxycarbonyl group is preferably an aryloxycarbonyl group having a carbon number of 7 to 30. Examples of the substituent include an ionic hydrophilic group. Examples of the aryloxycarbonyl group include a phenoxycarbonyl group.

The aryloxycarbonylamino group as the substituent which $A_1$ to $A_4$ may have includes an aryloxycarbonylamino group having a substituent and an unsubstituted aryloxycarbonylamino group. The aryloxycarbonylamino group is preferably an aryloxycarbonylamino group having a carbon number of 7 to 12 excluding a substituent. Examples of the substituent include an ionic hydrophilic group. Examples of the aryloxycarbonylamino group include a phenoxycarbonylamino group.

The imido group as the substituent which $A_1$ to $A_4$ may have includes an imido group having a substituent and an unsubstituted imido group. Examples of the imido group include an N-phthalimido group and an N-succinimido group.

The heterocyclic thio group as the substituent which $A_1$ to $A_4$ may have includes a heterocyclic thio group having a substituent and an unsubstituted heterocyclic thio group. The heterocyclic thio group preferably has a 5- or 6-membered hetero ring. Examples of the substituent include an ionic hydrophilic group Examples of the heterocyclic thio group include a 2-pyridylthio group.

The sulfinyl group as the substituent which $A_1$ to $A_4$ may have includes an alkylsulfinyl group and an arylsulfinyl group. Examples of the sulfinyl group include a 3-sulfopropylsulfinyl group and a 3-carboxypropylsulfinyl group.

The phosphoryl group as the substituent which $A_1$ to $A_4$ may have includes a phosphoryl group having a substituent and an unsubstituted phosphoryl group. Examples of the phosphoryl group include a phenoxyphosphoryl group and a phenylphosphoryl group.

The acyl group as the substituent which $A_1$ to $A_4$ may have includes an acyl group having a substituent and an unsubstituted acyl group. The acyl group is preferably an acyl group having a carbon number of 1 to 12 excluding a substituent. Examples of the substituent include an ionic hydrophilic group. Examples of the acyl group include an acetyl group and a benzoyl group.

The ionic hydrophilic group as the substituent which $A_1$ to $A_4$ may have includes a sulfo group, a carboxyl group, a phosphono group and a quaternary ammonium group. The ionic hydrophilic group is preferably a carboxyl group or a sulfo group, more preferably a sulfo group. The carboxyl group and sulfo group each may be in the state of a salt. Examples of the counter ion forming the salt include an ammonium ion, an alkali metal ion (e.g., lithium ion, sodium ion, potassium ion) and an organic cation (e.g., tetramethylguanidium ion).

The phthalocyanine compound represented by formula (I) preferably has an ionic hydrophilic group. Examples of the ionic hydrophilic group include a sulfo group, a carboxyl group, a phosphono group and a quaternary ammonium group. The ionic hydrophilic group is preferably a carboxyl group, a phosphono group or a sulfo group, more preferably a carboxyl group or a sulfo group. The carboxyl group, phosphono group and sulfo group each may be in the state of a salt. Examples of the counter ion forming the salt include an ammonium ion, an alkali metal ion (e.g., lithium ion, sodium ion, potassium ion) and an organic cation (e.g., tetramethylammonium ion, tetramethylguanidium ion, tetramethylphosphonium ion). Among these counter ions, an alkali metal salt is preferred, and a lithium salt is more preferred, because the solubility of the compound and the stability of the ink are enhanced. As for the number of ionic hydrophilic groups, a phthalocyanine compound having at least two ionic hydrophilic groups within one molecule is preferred, and a phthalocyanine compound having at least two sulfo groups and/or carboxyl groups is more preferred.

Also, in the phthalocyanine compound represented by formula (I), Pc (phthalocyanine ring) may form a dimer (for example, Pc-M-L-M-Pc) or a trimer through L (divalent linking group), where the plurality of M's may be the same or different.

The divalent linking group represented by L is preferably an oxy group —O—, a thio group —S—, a carbonyl group —CO—, a sulfonyl group —SO$_2$—, an imino group —NH—, a methylene group —CH$_2$— or a group formed by a combination thereof.

As for the preferred combination of substituents in the compound represented by formula (I), a compound where at least one of various substituents is the preferred group is preferred, a compound where a larger number of various substituents are the preferred groups is more preferred, and a compound where all substituents are the preferred groups is most preferred.

Among the phthalocyanine compounds represented by formula (I), a phthalocyanine compound having a structure represented by the following formula (II) is more preferred. The phthalocyanine compound represented by formula (II) for use in the present invention is described in detail below.

Formula (II):

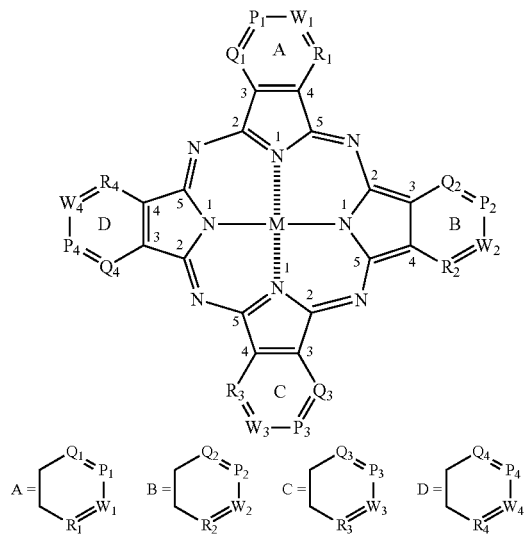

In formula (II), $Q_1$ to $Q_4$, $P_1$ to $P_4$, $W_1$ to $W_4$ and $R_1$ to $R_4$ each independently represents (=C($J_1$)- and/or —N=), (=C($J_2$)- and/or —N=), (=C($J_3$)- and/or —N=) or (=C($J_4$)- and/or —N=).

Here, four rings {ring A: (A), ring B: (B), ring C: (C), and ring D: (D)} comprising ($Q_1$, $P_1$, $W_1$ and $R_1$), ($Q_2$, $P_2$, $W_2$ and $R_2$), ($Q_3$, $P_3$, $W_3$ and $R_3$) or ($Q_4$, $P_4$, $W_4$ and $R_4$) all are not an aromatic hydrocarbon ring at the same time.

M has the same meaning as in formula (I), and preferred examples are also the same.

In particular, a phthalocyanine compound where at least one of the rings {ring A: (A), ring B: (B), ring C: (C), and ring D: (D)} comprising ($Q_1$, $P_1$, $W_1$ and $R_1$), ($Q_2$, $P_2$, $W_2$ and $R_2$), ($Q_3$, $P_3$, $W_3$ and $R_3$) or ($Q_4$, $P_4$, $W_4$ and $R_4$) represents a nitrogen-containing hetero ring is preferred.

$J_1$ to $J_4$ each independently represents a hydrogen atom and/or a substituent.

When $J_1$ to $J_4$ each represents a substituent, the substituent may further have a substituent. Here, at least one of $J_1$ to $J_4$ or at least one of the substituents of $J_1$ to $J_4$ has an ionic hydrophilic group as a substituent.

Furthermore, a phthalocyanine compound where at least one of the rings {ring A: (A), ring B: (B), ring C: (C), and ring D: (D)} comprising ($Q_1$, $P_1$, $W_1$ and $R_1$), ($Q_2$, $P_2$, $W_2$ and $R_2$), ($Q_3$, $P_3$, $W_3$ and $R_3$) or ($Q_4$, $P_4$, $W_4$ and $R_4$) is a nitrogen-containing hetero ring represented by the following formula (III) is preferred.

Formula (III)

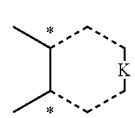

In formula (III), K represents a group necessary for forming a 6-membered nitrogen-containing hetero ring, and * represents a position at which the ring is bonded to the 3- and 4-positions of the 5-membered nitrogen-containing ring to form the phthalocyanine structure.

Here, when four rings {ring A: (A), ring B: (B), ring C: (C), and ring D: (D)} all are a pyridine ring at the same time, a pyridine ring where either one of ($Q_1$ and $R_1$), either one of ($Q_2$ and $R_2$), either one of ($Q_3$ and $R_3$) and either one of ($Q_4$ and $R_4$) are a nitrogen atom is excluded.

Also, a compound where four rings {ring A: (A), ring B: (B), ring C: (C), and ring D: (D)} all are a pyrazine ring is excluded.

A compound where out of the rings {ring A: (A), ring B: (B), ring C: (C), and ring D: (D)} comprising ($Q_1$, $P_1$, $W_1$ and $R_1$), ($Q_2$, $P_2$, $W_2$ and $R_2$), ($Q_3$, $P_3$, $W_3$ and $R_3$) or ($Q_4$, $P_4$, $W_4$ and $R_4$), at least one (preferably at least two) represents an aromatic hydrocarbon ring and at the same time, at least one represents a pyridine ring and/or a pyrazine ring is more preferred.

A compound where at least one (preferably at least two) of the rings {ring A: (A), ring B: (B), ring C: (C), and ring D: (D)} comprising ($Q_1$, $P_1$, $W_1$ and $R_1$), ($Q_2$, $P_2$, $W_2$ and $R_2$), ($Q_3$, $P_3$, $W_3$ and $R_3$) or ($Q_4$, $P_4$, $W_4$ and $R_4$) is an aromatic hydrocarbon ring represented by the following formula (IV) is still more preferred.

Formula (IV):

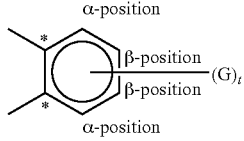

In formula (IV), * represents a position at which the ring is bonded to the 3- and 4-positions of the 5-membered nitrogen-containing ring to form the phthalocyanine structure.

In the benzene ring, the side closer to * is called an α-position and the side farther therefrom is called a β-position, but formula (IV) indicates that the position to which G is substituted is not specified as either the α-position or the β-position.

In formula (IV), each G independently represents a substituent selected from —SO—Z, —SO$_2$—Z, —SO$_2$N$V_1V_2$, —CON$V_1V_2$, —CO$_2$Z, —COZ, a sulfo group and a salt thereof, a carboxyl group and a salt thereof, and a phosphono group and a salt thereof.

Z's may be the same or different and each represents a substituted or unsubstituted alkyl group having a total carbon number of 1 to 20, a substituted or unsubstituted cycloalkyl group having a total carbon number of 3 to 20, a substituted or unsubstituted alkenyl group having a total carbon number of 2 to 20, a substituted or unsubstituted alkynyl group having a total carbon number of 2 to 12, a substituted or unsubstituted aralkyl group having a total carbon number of 7 to 20, a substituted or unsubstituted aryl group having a total carbon number of 6 to 20, or a substituted or unsubstituted heterocyclic group having a total carbon number of 4 to 20.

The substituent represented by G is preferably —$SO_2$—Z, —$SO_2NV_1V_2$ or —$CONV_1V_2$, more preferably —$SO_2$—Z or —$SO_2NV_1V_2$, and most preferably —$SO_2$—Z.

$V_1$'s may be the same or different and each is preferably a hydrogen atom, a substituted or unsubstituted alkyl group having a total carbon number of 1 to 20, a substituted or unsubstituted cycloalkyl group having a total carbon number of 3 to 20, a substituted or unsubstituted alkenyl group having a total carbon number of 2 to 20, a substituted or unsubstituted alkynyl group having a total carbon number of 2 to 12, a substituted or unsubstituted aralkyl group having a total carbon number of 7 to 20, a substituted or unsubstituted aryl group having a total carbon number of 6 to 20, or a substituted or unsubstituted heterocyclic group having a total carbon number of 4 to 20, more preferably a hydrogen atom, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, still more preferably a hydrogen atom or a substituted alkyl group having a total carbon number of 1 to 12, and most preferably a hydrogen atom.

$V_2$'s may be the same or different and each is preferably a hydrogen atom, a substituted or unsubstituted alkyl group having a total carbon number of 1 to 20, a substituted or unsubstituted cycloalkyl group having a total carbon number of 3 to 20, a substituted or unsubstituted alkenyl group having a total carbon number of 2 to 20, a substituted or unsubstituted alkynyl group having a total carbon number of 2 to 12, a substituted or unsubstituted aralkyl group having a total carbon number of 7 to 20, a substituted or unsubstituted aryl group having a total carbon number of 6 to 20, or a substituted or unsubstituted heterocyclic group having a total carbon number of 4 to 20, more preferably a hydrogen atom, a substituted or unsubstituted alkyl group having a total carbon number of 1 to 12, a substituted or unsubstituted aryl group having a total carbon number of 6 to 18, or a substituted or unsubstituted heterocyclic group having a total carbon number of 4 to 12, still more preferably a hydrogen atom or a substituted alkyl group having a total carbon number of 1 to 12, and most preferably a substituted alkyl group having a total carbon number of 1 to 12.

Z, $V_1$ and $V_2$ each independently may further have a substituent described above as the substituent which $A_1$ to $A_4$ may have.

Preferred examples of the substituent which Z, $V_1$ and $V_2$ may have are the same as those of the substituent which $A_1$ to $A_4$ may have.

At least one Z or $V_2$ preferably has an ionic hydrophilic group as a substituent.

t represents an integer of 0 to 4 and is preferably 1 or 2, and most preferably 1.

The aromatic hydrocarbon ring represented by formula (IV) is preferably represented by formula (V):

Formula (V):

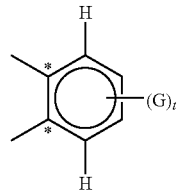

In formula (V), G and its preferred range are the same as those in formula (IV), t represents an integer of 0 to 2 and is preferably 1 or 2, more preferably 1.

Among the aromatic rings represented by formula (V), an aromatic hydrocarbon ring represented by the following formula (VII) is preferred.

Formula (VII):

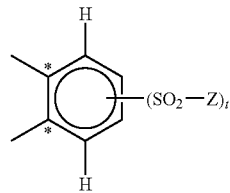

In formula (VI), Z has the same meaning as Z in formula (V), and preferred examples are also the same. t and * have the same meanings as t and * in formula (V), and preferred examples are also the same.

Among the colorants represented by formula (II), a phthalocyanine compound where out of four rings (A), (B), (C) and (D), at least one has an aromatic hydrocarbon ring represented by formula (VII) and at the same time, at least one has a pyridine ring represented by the following formula (VI) is most preferred.

Formula (VI):

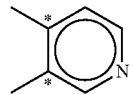

In formula (VI), * represents a position at which the ring is bonded to the 3- and 4-positions of the 5-membered nitrogen-containing ring to form the phthalocyanine structure.

Preferred combinations in the phthalocyanine compound as the colorant represented by formula (II) are as follows.

(a) A phthalocyanine compound where at least one of the rings {ring A: (A), ring B: (B), ring C: (C), and ring D: (D)} comprising ($Q_1$, $P_1$, $W_1$ and $R_1$), ($Q_2$, $P_2$, $W_2$ and $R_2$), ($Q_3$, $P_3$, $W_3$ and $R_3$) or ($Q_4$, $P_4$, $W_4$ and $R_4$) represents a hetero ring is preferred.

(b) A phthalocyanine compound where at least one of the rings {ring A: (A), ring B: (B), ring C: (C), and ring D: (D)} comprising ($Q_1$, $P_1$, $W_1$ and $R_1$), ($Q_2$, $P_2$, $W_2$ and $R_2$), ($Q_3$, $P_3$, $W_3$ and $R_3$) or ($Q_4$, $P_4$, $W_4$ and $R_4$) represents a 6-membered nitrogen-containing hetero ring is preferred. Here, when four rings {ring A: (A), ring B: (B), ring C: (C), and ring D: (D)} all are a pyridine ring at the same time, a pyridine ring where either one of ($Q_1$ and $R_1$), either one of ($Q_2$ and $R_2$), either one of ($Q_3$ and $R_3$) and either one of ($Q_4$ and $R_4$) are a nitrogen atom is excluded. Also, a compound where four rings {ring A: (A), ring B: (B), ring C: (C), and ring D: (D)} all are a pyrazine ring is excluded.

(c) A phthalocyanine compound where out of the rings {ring A: (A), ring B: (B), ring C: (C), and ring D: (D)} comprising ($Q_1$, $P_1$, $W_1$ and $R_1$), ($Q_2$, $P_2$, $W_2$ and $R_2$), ($Q_3$, $P_3$, $W_3$ and $R_3$) or ($Q_4$, $P_4$, $W_4$ and $R_4$), at least one represents an aromatic hydrocarbon ring and at the same time, at least one represents a pyridine ring and/or a pyrazine ring is preferred. Above all, a phthalocyanine compound where at least one of the rings {ring A: (A), ring B (B), ring C: (C), and ring D: (D)} comprising ($Q_1$, $P_1$, $W_1$ and $R_1$), ($Q_2$, $P_2$, $W_2$ and $R_2$), ($Q_3$, $P_3$, $W_3$ and $R_3$) or ($Q_4$, $P_4$, $W_4$ and $R_4$) represents an aromatic ring substituted by a sulfinyl, sulfonyl or sulfamoyl group having an ionic hydrophilic group as a substituent is more preferred; a phthalocyanine compound where at least one of the rings {ring A: (A), ring B: (B), ring C: (C), and ring D: (D)} comprising ($Q_1$, $P_1$, $W_1$ and $R_1$), ($Q_2$, $P_2$, $W_2$ and $R_2$), ($Q_3$, $P_3$, $W_3$ and $R_3$) or ($Q_4$, $P_4$, $W_4$ and $R_4$) represents an aromatic hydrocarbon ring substituted by a sulfonyl or sulfamoyl group having an ionic hydrophilic group as a substituent is still more preferred; and a phthalocyanine compound where at least one of the rings {ring A: (A), ring B: (B), ring C: (C), and ring D: (D)} comprising ($Q_1$, $P_1$, $W_1$ and $R_1$), ($Q_2$, $P_2$, $W_2$ and $R_2$), ($Q_3$, $P_3$, $W_3$ and $R_3$) or ($Q_4$, $P_4$, $W_4$ and $R_4$) represents an aromatic hydrocarbon ring substituted by a sulfonyl group having an ionic hydrophilic group as a substituent is most preferred.

(d) M is preferably a hydrogen atom, a metal atom or an oxide, hydroxide or halide thereof, more preferably Cu, Ni, Zn, Al or the like, and most preferably Cu.

(e) The molecular weight (average) of the phthalocyanine compound is preferably from 995 to 2,500, more preferably from 995 to 2,000, still more preferably from 995 to 1,800, and most preferably from 995 to 1,600.

(f) The ionic hydrophilic group contained within one molecule of the phthalocyanine compound represented by formula (II) is preferably a sulfo group, a carboxyl group or a phosphono group, more preferably a sulfo group. The sulfo group, carboxyl group and phosphono group each may be in the state of a salt. Examples of the counter ion forming the salt include an ammonium ion, an alkali metal ion (e.g., lithium ion, sodium ion, potassium ion) and an organic cation (e.g., tetramethylammonium ion, tetramethylguanidium ion, tetramethylphosphonium ion). Among these counter ions, an alkali metal salt is preferred, and a lithium salt is more preferred, because the solubility of the compound and the stability of the ink are enhanced.

The phthalocyanine compound represented by formula (II) is preferably a compound having at least one or more ionic hydrophilic group within one molecule, more preferably a compound where the ionic hydrophilic group is a sulfo group, and most preferably a compound having two or more sulfo groups.

The phthalocyanine compound represented by formula (II) has at least one ionic hydrophilic group within the molecule and therefore, exhibits good solubility or dispersibility in an aqueous medium.

As for the preferred combination of substituents in the colorant represented by formula (II) for use in the present invention, a compound where at least one of various substituents is the preferred group is preferred, a compound where a larger number of various substituents are the preferred groups is more preferred, and a compound where all substituents are the preferred groups is most preferred.

The phthalocyanine compound represented by formula (I) or (II) for use in the present invention is represented, for example, by the formula shown below.

The phthalocyanine compound can be derived by reacting a dicarbonitrile derivative (formula a) and/or a 1,3-diiminoisoindoline derivative (formula b) with a metal derivative represented by formula (VIII).

In formula (VIII), M has the same meaning as in formula (I), and preferred examples are also the same.

Z represents a monovalent or divalent ligand.

d represents an integer of 1 to 4.

The synthesis of the water-soluble substituted phthalocyanine compound includes a method using a raw material obtained by previously introducing an ionic hydrophilic group into formula a and/or formula b, and a method of obtaining the phthalocyanine compound and then water-solubilizing the compound by introducing an ionic hydrophilic group.

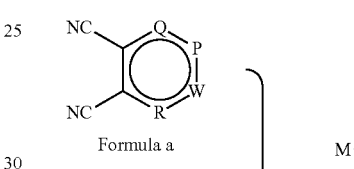

Formula a

&/or

Formula b

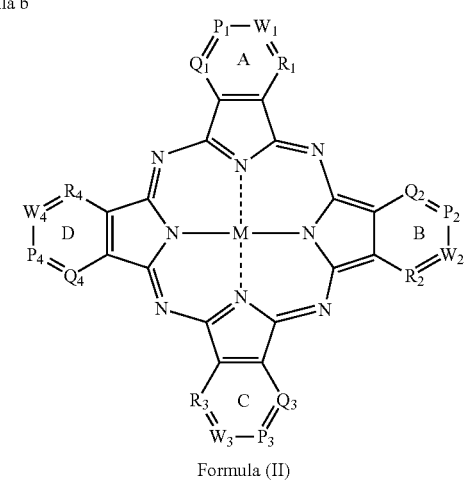

Formula (II)

In formulae above, Q, P, W and R are respectively corresponding to $Q_1$ to $Q_4$, $P_1$ to $P_4$, $W_1$ to $W_4$, and $R_1$ to $R_4$ in formula (II).

In the case where at least one of the ring (A), the ring (B), the ring (C) and the ring (D) in the phthalocyanine compound represented by formula (II) is a heterocyclic group (preferably a nitrogen-containing hetero ring) and at the same time, at least one of the ring (A), the ring (B), the ring (C) and the ring (D) in the substituted phthalocyanine compound represented by formula (II) is an aromatic hydrocarbon ring, the phthalocyanine compound represented by formula (II) can be produced, for example, starting from a dicarbonitrile derivative (formula a) and/or a 1,3-diiminoisoindoline derivative (formula b) where the ring comprising Q, P, W and R forms a hetero ring (preferably a nitrogen-containing hetero ring), and a dicarbonitrile derivative (formula a) and/or a 1,3-diiminoisoindoline derivative (formula b) where the ring comprising Q, P, W and R forms an aromatic ring.

In the production process of the phthalocyanine compound represented by formula (I) or (II) for use in the present invention, the compound may be easily produced using the method described in detail in JP-A-2005-179469.

As for the phthalocyanine compound, a derivative where a soluble group is introduced only into the β-position tends to be by far excellent in the color hue, light fastness, ozone gas resistance and the like as compared with other derivatives.

More specifically, the phthalocyanine compound for use in the present invention having [1] a good spectral absorption property (aggregation of the phthalocyanine compound is accelerated by virtue of introduction of a specific soluble group into the β-position), [2] high image fastness (by virtue of high oxidation potential and acceleration of strong aggregation, for example, color fading by an oxidation reaction between the phthalocyanine compound and the ozone gas as an electrophilic reagent is suppressed), [3] high solubility in the ink composition, and [4] an ability of giving an ink solution with good aging stability, is considered to be achieved by introducing a specific aromatic hydrocarbon ring and a specific nitrogen-containing hetero ring into the coloring matter molecule as the mother nucleus and thereby enabling to form a firm aggregate with high oxidation potential and at the same time, selectively introduce only an objective number of specific soluble groups.

The amount of the colorant added is preferably from 0.2 to 10 mass %, more preferably from 0.5 to 7 mass %, and most preferably from 1 to 5 mass %, based on the ink composition.

Specific examples (Dyes 101 to 125) of the colorant for use in the present invention are set forth below, but the present invention is not limited to these specific examples.

In the Tables, examples of the four rings (A), (B), (C) and (D) of the phthalocyanine mother nucleus are derived from a charging ratio (eq./eq.) of different structures of a dicarbonitrile derivative (formula a) and/or a 1,3-diiminoisoindoline derivative (formula b) at the condensation reaction in the process of synthesizing the phthalocyanine compound of the present invention, and indicate an average value of the mixing ratio in the obtained phthalocyanine compound.

TABLE 1

| Compound | M | (A) | (B) | (C) | (D) |
|---|---|---|---|---|---|
| 101 | Cu | 2,5-dimethylphenyl-SO$_2$(CH$_2$)$_3$SO$_3$Li | 2,5-dimethylphenyl-SO$_2$(CH$_2$)$_3$SO$_3$Li | 2,5-dimethylphenyl-SO$_2$(CH$_2$)$_3$SO$_3$Li | 2,3-dimethylpyridine |
| 102 | Cu | 2,5-dimethylphenyl-SO$_2$(CH$_2$)$_3$SO$_3$Li | 2,5-dimethylphenyl-SO$_2$(CH$_2$)$_3$SO$_3$Li | 2,5-dimethylphenyl-SO$_2$(CH$_2$)$_3$SO$_3$Li | 3,4-dimethylpyridine |
| 103 | Cu | 2,5-dimethylphenyl-SO$_2$(CH$_2$)$_3$SO$_3$Li | 2,5-dimethylphenyl-SO$_2$(CH$_2$)$_3$SO$_3$Li | 2,5-dimethylphenyl-SO$_2$(CH$_2$)$_3$SO$_3$Li | 3-methylpyrazine |
| 104 | Cu | 2,5-dimethylphenyl-SO$_2$(CH$_2$)$_3$SO$_3$Li | 2,5-dimethylphenyl-SO$_2$(CH$_2$)$_3$SO$_3$Li | 2,3-dimethylpyridine | 2,3-dimethylpyridine |

TABLE 1-continued

| Compound | M | (A) | (B) | (C) | (D) |
|---|---|---|---|---|---|
| 105 | Cu | dimethylphenyl-SO$_2$(CH$_2$)$_3$SO$_3$Li | dimethylphenyl-SO$_2$(CH$_2$)$_3$SO$_3$Li | 3,4-dimethylpyridine | 3,4-dimethylpyridine |

TABLE 2

| Compound | M | (A) | (B) | (C) | (D) |
|---|---|---|---|---|---|
| 106 | Cu | methylphenyl-di[SO$_2$(CH$_2$)$_3$SO$_3$Li] | methylphenyl-di[SO$_2$(CH$_2$)$_3$SO$_3$Li] | methylphenyl-di[SO$_2$(CH$_2$)$_3$SO$_3$Li] | 2,3-dimethylpyridine |
| 107 | Cu | methylphenyl-di[SO$_2$(CH$_2$)$_3$SO$_3$Li] | methylphenyl-di[SO$_2$(CH$_2$)$_3$SO$_3$Li] | methylphenyl-di[SO$_2$(CH$_2$)$_3$SO$_3$Li] | 3,4-dimethylpyridine |
| 108 | Cu | methylphenyl-di[SO$_2$(CH$_2$)$_3$SO$_3$Li] | methylphenyl-di[SO$_2$(CH$_2$)$_3$SO$_3$Li] | methylphenyl-di[SO$_2$(CH$_2$)$_3$SO$_3$Li] | 2,3-dimethylpyrazine |
| 109 | Cu | methylphenyl-di[SO$_2$(CH$_2$)$_3$SO$_3$Li] | methylphenyl-di[SO$_2$(CH$_2$)$_3$SO$_3$Li] | 2,3-dimethylpyridine | 3,4-dimethylpyridine |
| 110 | Cu | methylphenyl-di[SO$_2$(CH$_2$)$_3$SO$_3$Li] | 2,3-dimethylpyrazine | 2,3-dimethylpyridine | 3,4-dimethylpyridine |

TABLE 3

| Compound | M | (A) | (B) |
|---|---|---|---|
| 111 | Cu | 3,5-dimethylphenyl-SO₂(CH₂)₃SO₃Li | 3,5-dimethylphenyl-SO₂(CH₂)₃SO₃Li |
| 112 | Cu | 3,4-dimethylphenyl with two -SO₂(CH₂)₃SO₃Li groups | 3,5-dimethylphenyl-SO₂(CH₂)₃SO₃Li |
| 113 | Cu | 3,5-dimethylphenyl-SO₂(CH₂)₃SO₂NHCH₂CH(OH)CH₂SO₃Li | 3,5-dimethylphenyl-SO₂(CH₂)₃SO₂NHCH₂CH(OH)CH₂SO₃Li |
| 114 | Cu | 3,5-dimethylphenyl-SO₂(CH₂)₃CO₂Li | 3,5-dimethylphenyl-SO₂(CH₂)₃CO₂Li |
| 115 | Cu | 3,5-dimethylphenyl-SO₂CH₂CH₂CH(CH₃)SO₃Li | 3,5-dimethylphenyl-SO₂CH₂CH₂CH(CH₃)SO₃Li |

| Compound | (C) | (D) |
|---|---|---|
| 111 | 3,5-dimethylphenyl-SO₂(CH₂)₃SO₂NHCH₂CH(OH)CH₃ | 2,3-dimethylpyridine |
| 112 | 3,5-dimethylphenyl-SO₂(CH₂)₃SO₃Li | 3,4-dimethylpyridine |

TABLE 3-continued
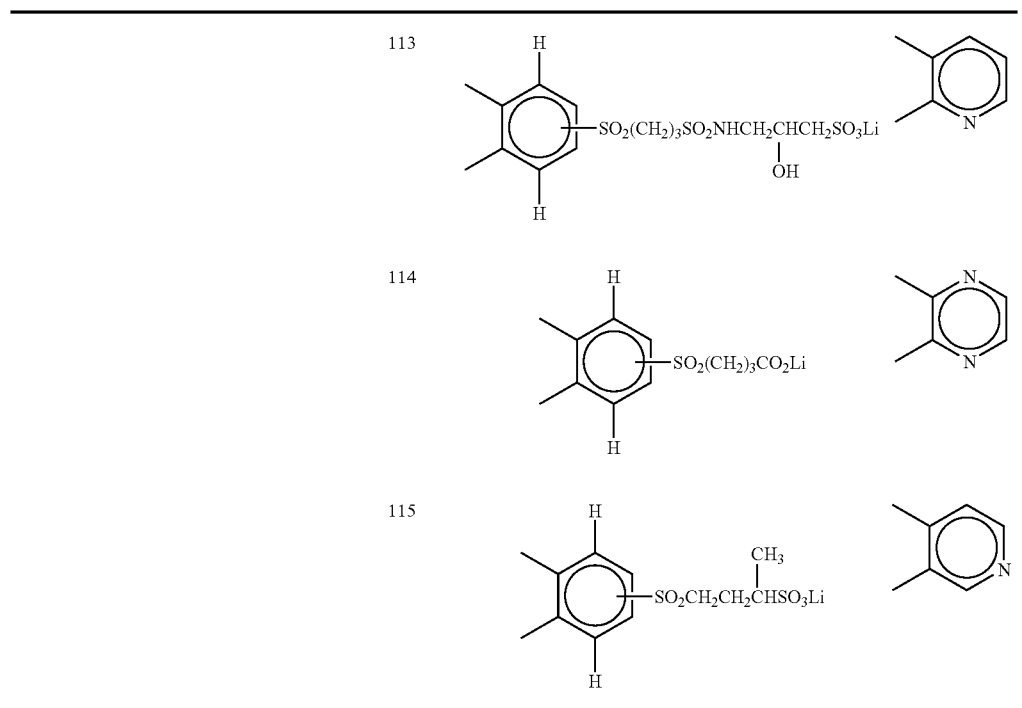
TABLE 4
| Compound | M | (A) | (B) | (C) | (D) |
|---|---|---|---|---|---|
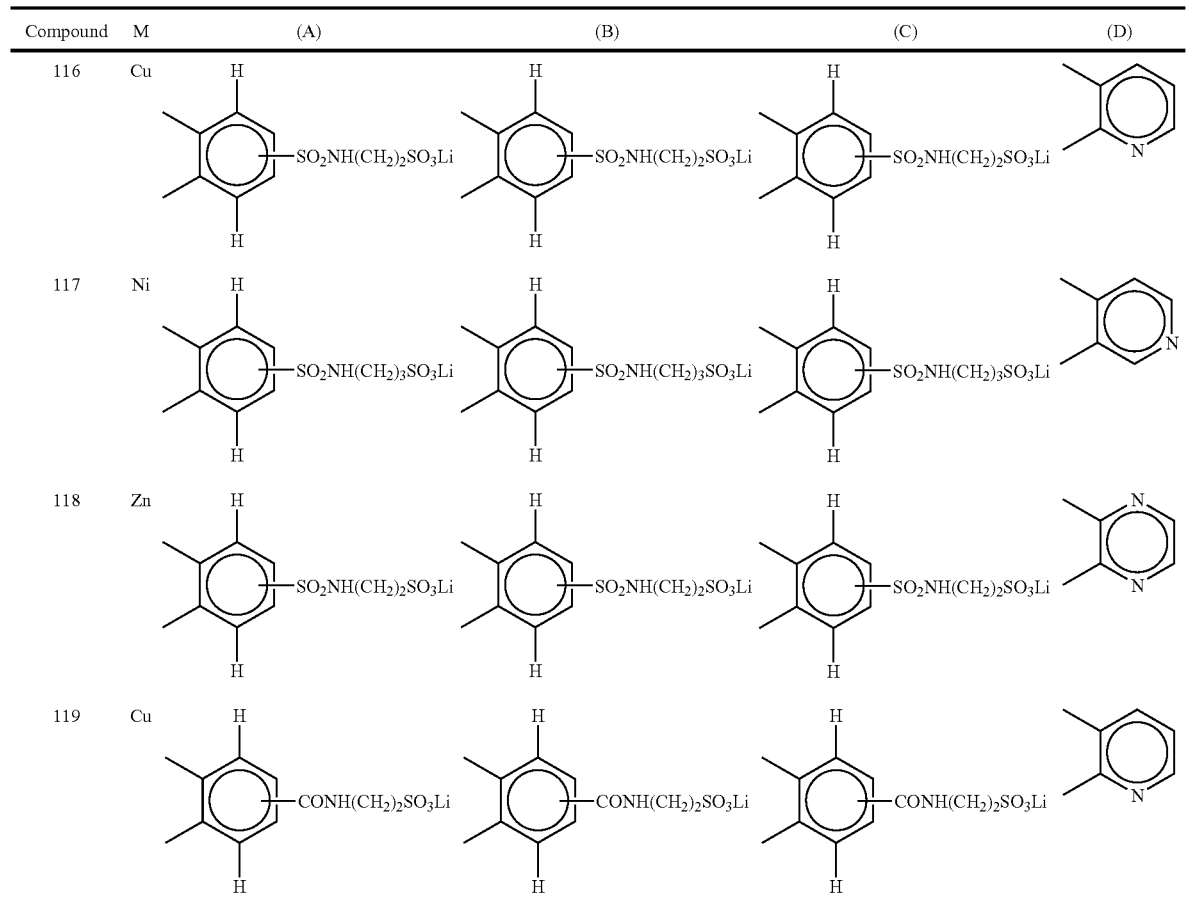

TABLE 4-continued

| Compound | M | (A) | (B) | (C) | (D) |
|---|---|---|---|---|---|
| 120 | Cu | 3SO3Li) | 2SO3Li) | | |

TABLE 5

| Compound | M | (A) | (B) | (C) | (D) |
|---|---|---|---|---|---|
| 121 | Cu | imidazole-(CH₂)₃SO₃K | imidazole-(CH₂)₃SO₃K | imidazole-(CH₂)₃SO₃K | imidazole-(CH₂)₃SO₃K |
| 122 | Cu | benzothiophene-SO₃Li | benzothiophene-SO₃Li | benzothiophene-SO₃Li | benzothiophene-SO₃Li |
| 123 | Cu | pyrimidine-S(CH₂)₃SO₃Na | pyrimidine-S(CH₂)₃SO₃Na | pyrimidine-S(CH₂)₃SO₃Na | pyrimidine-S(CH₂)₃SO₃Na |
| 124 | Cu | pyrrolo-imidazole-CH₂CO₂K/CN | pyrrolo-imidazole-CH₂CO₂K/CN | pyrrolo-imidazole-CH₂CO₂K/CN | pyrrolo-imidazole-CH₂CO₂K/CN |
| 125 | Cu | triazole-(CH₂)₃SO₃Li | triazole-(CH₂)₃SO₃Li | triazole-(CH₂)₃SO₃Li | triazole-(CH₂)₃SO₃Li |

The guanidine-based compound used together with the colorant in the present invention is described in detail below.

(Guanidine-Based Compound)

The guanidine-based compound for use in the present invention means a compound having a structure of N—C(=N)—N.

The guanidine-based compound is preferably a compound represented by formula (1).

Formula (1):

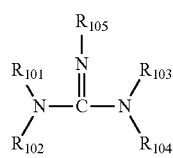

(wherein $R_{101}$, $R_{102}$, $R_{103}$ and $R_{104}$ each independently represents a hydrogen atom, an alkyl group, an alkoxy group, an aryl group, a heterocyclic group or an amino group, $R_{105}$ represents a hydrogen atom, an alkyl group, an alkoxy group, an aryl group or a heterocyclic group, and these alkyl group, alkoxy group, aryl group, heterocyclic group and amino group each may be substituted or unsubstituted).

The alkyl group is preferably an alkyl group having a carbon number of 1 to 12, more preferably an alkyl group having a carbon number of 1 to 6.

The alkoxy group is preferably an alkoxy group having a carbon number of 1 to 12, more preferably an alkoxy group having a carbon number of 1 to 6.

The aryl group is preferably an aryl group having a carbon number of 6 to 18, more preferably an aryl group having a carbon number of 6 to 10.

Examples of the heterocyclic group include a furyl group, a pyridyl group, a pyrimidyl group, a pyrrolyl group, a pyrrolinyl group, a pyrrolidyl group, a dioxolyl group, a pyrazolyl group, a pyrazolynyl group, a pyrazolidyl group, an imidazolyl group, an oxazolyl group, a thiazolyl group, an oxadiazolyl group, a triazolyl group, a thiadiazolyl group, a pyryl group, a pyridyl group, a piperidyl group, a dioxanyl group, a morpholyl group, a pyridazyl group, a pyrazyl group, a piperazyl group, a triazyl group and a trithianyl group.

The alkyl group, alkoxy group, aryl group and heterocyclic group represented by $R_{101}$ to $R_{105}$ include those where the hydrogen atom is further substituted by another arbitrary substituent. Examples of such a substituent include a halogen atom such as chlorine, a nitro group, an amino group, a carboxyl group, a hydroxyl group, a carbamoyl group, an amidino group, a guanidino group and an aryloxy group (the aryl moiety may be further substituted by a substituent enumerated here). Two or more kinds of these substituents may be substituted in the same molecule. Also, in the amino group, carbamoyl group, amidino group and guanidino group, the hydrogen atom may be substituted by an alkyl group, alkoxy group, aryl group or heterocyclic group represented by $R_{101}$ to $R_{105}$.

In the amino group represented by $R_{101}$ to $R_{104}$, the hydrogen atom may be substituted by an alkyl group, alkoxy group, aryl group or heterocyclic group represented by $R_{101}$ to $R_{105}$.

The guanidine-based compound may be in the form of a salt or a metal complex. Examples thereof include hydrochloride, nitrate, phosphate, sulfamate, carbonate and acetate.

The guanidine-based compound include those shown below, and these may be used individually or in combination, but the present invention is not limited thereto

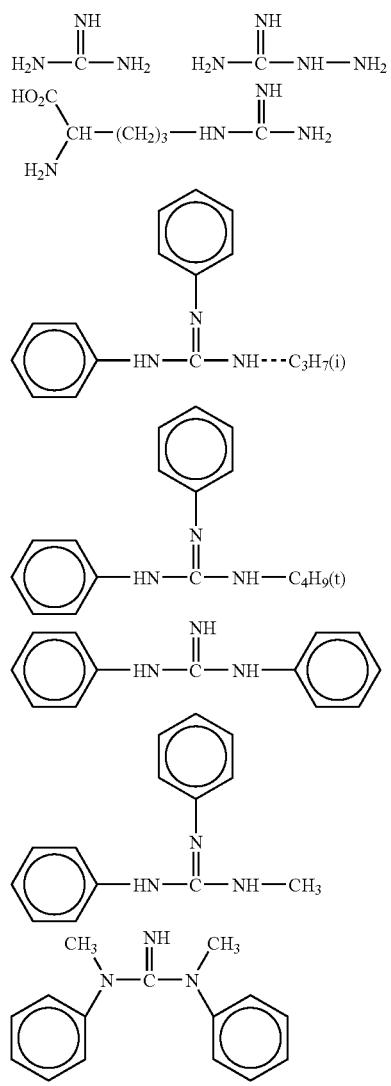

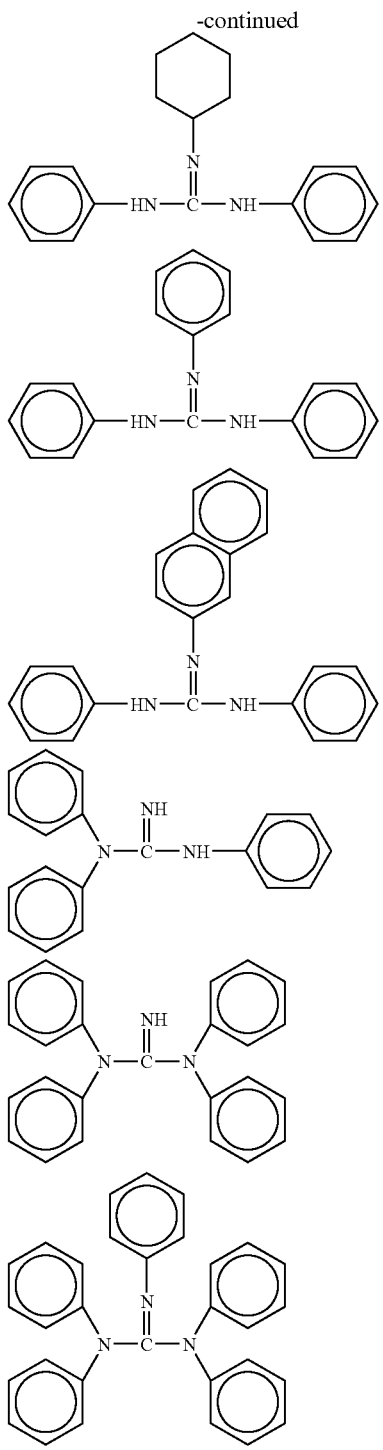

As for the synthesis method of the compound represented by formula (I), the compound can be obtained, for example, by passing through at least a step of causing ammonia to act on a hydrochloride of the corresponding imino ether.

The guanidine-based compound may be a polymer having an N—C(=N)—N structure. Such a polymer includes, but is not limited to, a compound containing a repeating unit represented by the following formula (2-Aa), (2-Ab) or (2-Ac). The compound containing this repeating unit may be an oligomer. Also, the compound containing a repeating unit represented by formula (2-Ac) may be a monomer. These compounds are preferably a salt with an acid.

Formula (2-Aa):

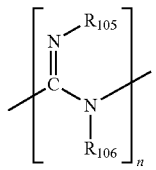

In formula (2-Aa), $R_{105}$ has the same meaning as above, $R_{106}$ represents any one of $R_{101}$, $R_{102}$, $R_{103}$ and $R_{104}$, and the n-number of $R_{105}$'s or $R_{106}$'s may be the same or different. n is an integer of 2 or more and is preferably an integer of 2 to 30, more preferably from 2 to 15.

The compound containing a repeating unit represented by formula (2-Aa) may be a homopolymer or a copolymer with another repeating unit such as azetidinium. The terminal structure may be appropriately selected but is preferably a hydrogen atom, an alkyl group, an alkoxy group, an aryl group, a heterocyclic group or an amino group.

Formula (2-Ab):

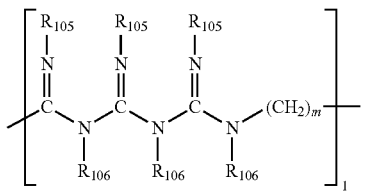

In formula (2-Ab), $R_{105}$ and $R_{106}$ have the same meanings as above, and the l-number of $R_{105}$'s or $R_{106}$'s may be the same or different. l represents an integer of 2 or more and is preferably an integer of 2 to 10, more preferably from 2 to 5. m represents an integer of 1 or more and is preferably an integer of 1 to 6, more preferably from 1 to 3. The compound containing a repeating unit represented by formula (2-Ab) may be a homopolymer or a copolymer with another repeating unit such as azetidinium. The terminal structure may be appropriately selected but is preferably a hydrogen atom, an alkyl group, an alkoxy group, an aryl group, a heterocyclic group or an amino group.

Formula (2-Ac):

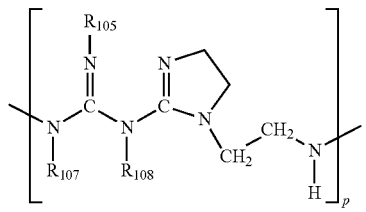

In formula (2-Ac), $R_{105}$ has the same meanings as above, $R_{107}$ has the same meaning as $R_{101}$ or $R_{102}$, $R_{108}$ has the same meaning as $R_{104}$ or $R_{105}$, and the p-number of $R_{103}$'s, $R_{107}$'s or $R_{108}$'s may be the same or different. p represents an integer of 1 or more and is preferably an integer of 1 to 10, more preferably from 1 to 5. The compound containing a repeating unit represented by formula (2-Ac) may be a homopolymer or a copolymer with another repeating unit such as azetidinium. The terminal structure may be appropriately selected but is preferably a hydrogen atom, an alkyl group, an alkoxy group, an aryl group, a heterocyclic group or an amino group.

The total amount added of at least one kind of a guanidine-based compound is preferably from 0.1 to 10 mass %, more preferably from 0.3 to 7 mass %, and most preferably from 0.5 to 5 mass %, based on the ink composition.

The colorant/guanidine-based compound (mass ratio) is preferably from 0.01 to 100, more preferably from 0.1 to 50, still more preferably from 0.3 to 10.

The colorless water-soluble planar compound having more than ten delocalized π-electrons within one molecule, which is used together with the colorant in the present invention, is described below.

When the number of π-electrons constituting a delocalized π-electron system is increased and the π-electron system is broadened, the ink composition comes to have absorption in the visible region in many cases. The term "colorless" as used in the present invention includes a state that the compound is very slightly colored within the range of not affecting the image. The compound may be a fluorescent compound but is preferably a compound having no fluorescence, more preferably a compound where λmax having the absorption peak on the longest wave side is 350 nm or less, preferably 320 nm or less, and at the same time, the molar absorption coefficient is 10,000 or less.

The compound for use in the present invention has more than ten delocalized π-electrons within one molecule. The number of π-electrons is not particularly limited in its upper limit but is preferably 80 or less, more preferably 50 or less, still more preferably 30 or less. Also, more than ten π-electrons may form one large delocalized system but may form two or more delocalized systems. In particular, a compound having two or more aromatic rings within one molecule is preferred. The aromatic ring may be an aromatic hydrocarbon ring or an aromatic hetero ring containing a heteroatom or may be ring-condensed to form one aromatic ring. Examples of the aromatic ring include benzene, naphthalene, anthracene, pyridine, pyrimidine, pyrazine and triazine.

The water-soluble planar compound for use in the present invention is preferably a compound which dissolves in an amount of at least 1 g, more preferably 5 g of more, most preferably 10 g or more, per 100 g of water at 20° C.

In the case of a compound having two or more aromatic rings within one molecule, the compound preferably has at least two solubilizing groups bonded to the aromatic ring in the molecule. Examples of the useful solubilizing group include, but are not limited to, a sulfo group, a carboxyl group, a hydroxy group, a phosphono group, a carbonamido group, a sulfonamido group, a quaternary ammonium salt and other groups known to one skilled in the art. Among these, a sulfo group and a carboxyl group are preferred, and a sulfo group is most preferred.

The maximum number of solubilizing groups in the molecule is limited only by the number of usable positions of the substituent, but for the practical purpose, it may suffice if ten same or different solubilizing groups are present in the molecule. The counter cation of the solubilizing group is not limited. The counter cation includes an alkali metal, ammonium and an organic cation (e.g., tetramethylammonium, guanidinium, pyridinium) and is preferably an alkali metal or ammonium, especially preferably lithium, sodium, potassium or ammonium, and most preferably lithium, sodium, or ammonium.

Specific examples of the compound include the compounds described in JP-A-63-55544, JP-A-3-146947, JP-A-3-149543, JP-A-2001-201831, JP-A-2002-139822, JP-A-2002-196460, JP-A-2002-244257, JP-A-2002-244259, JP-A-2002-296743, JP-A-2002-296744, JP-A-2003-255502, JP-A-2003-307823, JP-A-2004-4500 and JP-A-2004-170964.

Above all, a compound represented by the following formula (3) is preferred.

$$A\text{-}X\text{-}L\text{-}(Y\text{—}B)_n \qquad \text{Formula (3)}$$

In the formula, A, L and B each independently represents an aromatic group (including an aryl group and an aromatic heterocyclic group). X and Y each independently represents a divalent linking group, n represents 0 or 1. The aromatic group may be monocyclic or a condensed ring. The divalent linking group is an alkylene group, an alkenylene group, —CO—, —SO$_n$— (n is 0, 1 or 2), —NR— (R represents a hydrogen atom, an alkyl group, an aryl group or a heterocyclic group), —O—, or a divalent group comprising a combination of these linking groups. However, the compound represented by formula (3) contains at least one ionic hydrophilic group selected from a sulfo group, a carboxyl group, a phenolic hydroxyl group and a phosphono group. The ionic hydrophilic group may be in the form of a salt, and the counter cation thereof is not limited. The counter cation includes an alkali metal, ammonium and an organic cation (e.g., tetramethylammonium, guanidinium, pyridinium) and is preferably an alkali metal or ammonium, more preferably lithium, sodium, potassium or ammonium, and most preferably lithium, sodium or ammonium.

The compound represented by formula (3) may have a substituent other than an ionic hydrophilic group, and specific examples of the substituent include an alkyl group, an aryl group, an aralkyl group, a heterocyclic group, an alkoxy group, an aryloxy group, a hydroxyl group, an amino group (including an anilino group and a heterocyclic amino group), an acyl group, an acylamino group, a ureido group, a halogen atom, a sulfamoyl group, a carbamoyl group, a sulfonamido group, a sulfonyl group, a sulfenyl group and a sulfinyl group. These groups each may further have a substituent. Among the compounds of formula 3, a compound where n=1 or where at least one of A, L and B is an aromatic hetero ring is preferred, and a compound containing from two to four ionic hydrophilic groups is more preferred.

The amount used of the colorless water-soluble planar compound having more than ten delocalized π-electrons within one molecule for use in the present invention is preferably from 0.01 to 10 mass %, more preferably from 0.1 to 7.0 mass %, and most preferably from 0.5 to 5.0 mass %, based on the ink.

The colorant/planar compound (mass ratio) is preferably from 0.02 to 1,000, more preferably from 0.1 to 100, still more preferably from 0.2 to 50.

If the amount used is small, the ability of preventing bronze/improving fastness to ozone gas may be insufficient.

If the amount used is large, the ejection property may be worsened.

The operation mechanism by which the compound of the present invention prevents bronze is not clearly known, but it is considered that the compound acts as a disaggregating agent of eliminating aggregation by causing the π-electron to exert a stronger interaction on the coloring matter aggregated (associated) by the π-electron interaction between molecules of the coloring matter and the bronze phenomenon is thereby improved. In order to intrude between aggregated coloring matters or exert a strong π-electron interaction on the coloring matter present in the surface of the coloring matter aggregate, it is important that the disaggregating agent is planar and the π-electron system is largely broadened. Furthermore, in order to cause no precipitation of the disaggregating agent itself or a complex formed by the coloring matter and the disaggregating agent, it is also important that the disaggregating agent has sufficiently high solubility. The necessary number of π-electrons greatly varies depending on the coloring matter used for the inkjet ink, but since the coloring matter used for the inkjet ink has a largely extended planar structure for increasing the fixing property as represented by the direct dye, it is presumed that the disaggregating agent needs to be a colorless water-soluble planar compound having a system of more than ten delocalized π-electrons within one molecule. In addition, the complex formed by the disaggregating agent and the coloring matter takes a form of protecting the coloring matter with the disaggregating agent and therefore, the resistance against ozone gas is also enhanced.

Preferred examples of the compound for use in the present invention include the compounds described in JP-A-2002-139822, JP-A-2002-196460, JP-A-2002-244257, JP-A-2002-244259, JP-A-2002-296743 and JP-A-2002-296744, supra. Representative compounds (disaggregating agent) are set forth below.

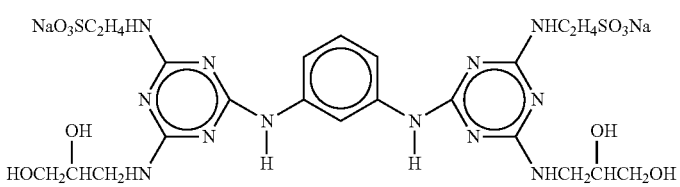

(P-1)

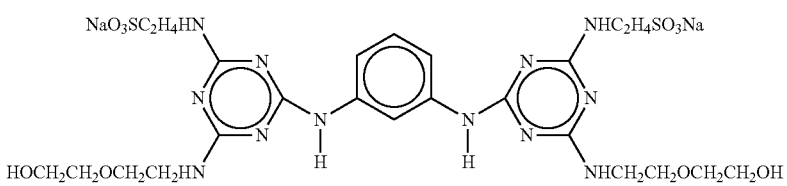

(P-2)

-continued
(P-3)
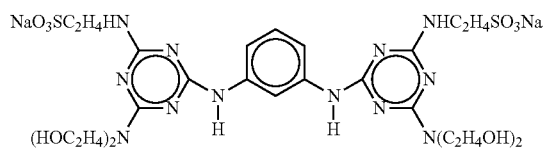
(P-4)
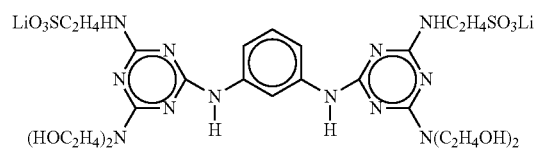
(P-5)
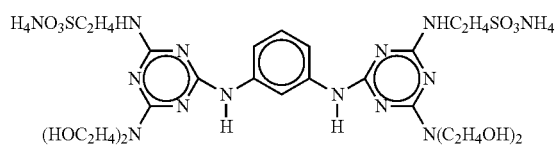
(P-6)
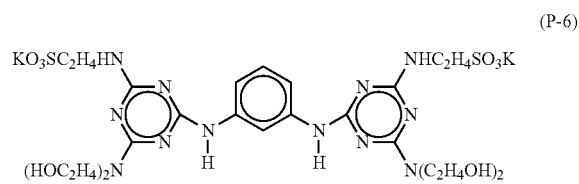
(P-7)
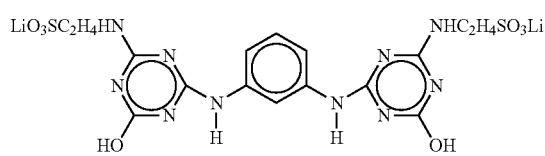
(P-8)
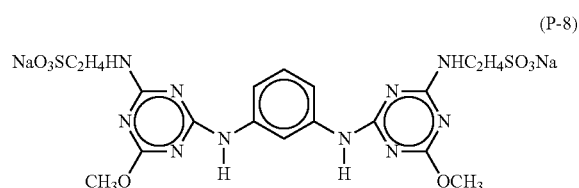
(P-9)
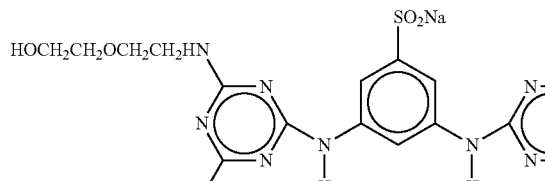
(P-10)
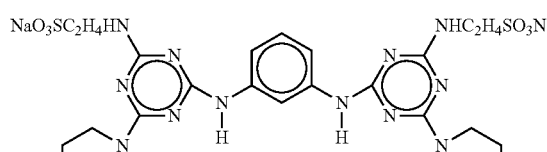
(P-11)
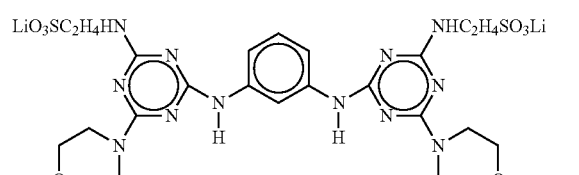
(P-12)
(P-13)
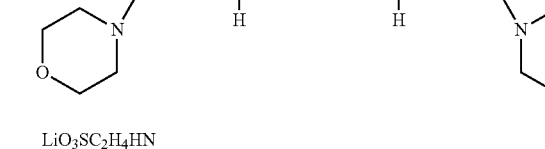
(P-14)
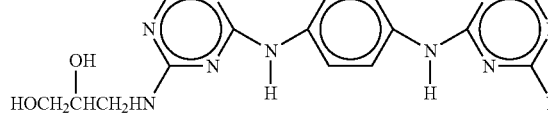

-continued
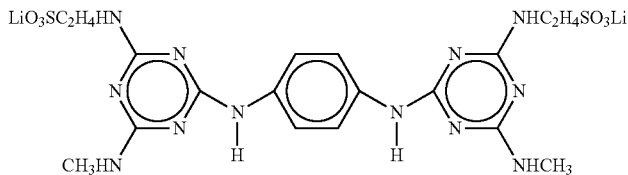 (P-15)
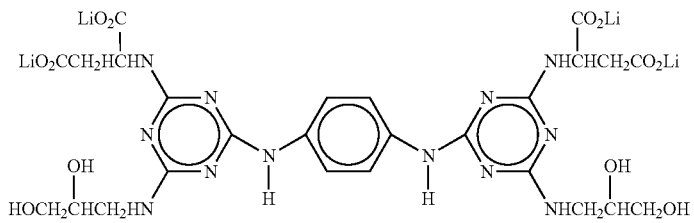 (P-16)
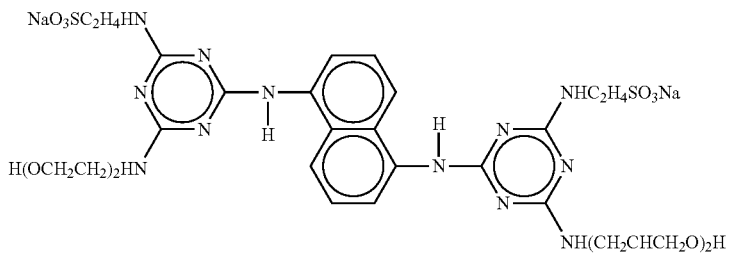 (P-17)
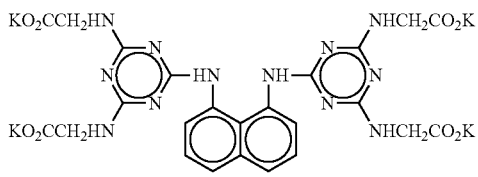 (P-18)
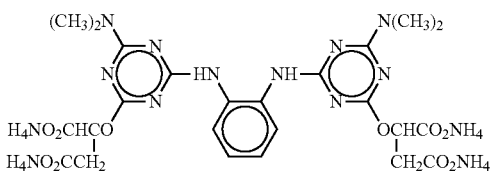 (P-19)
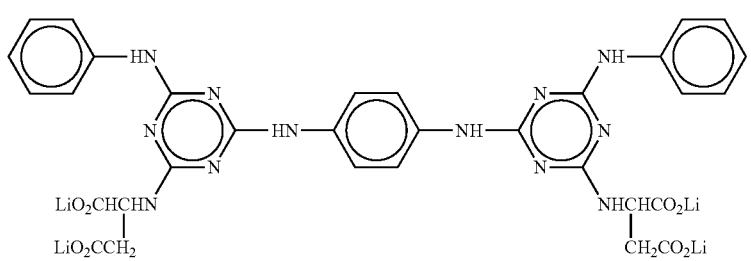 (P-20)
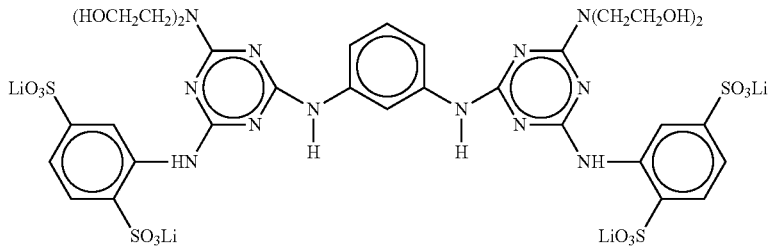 (P-21)

-continued
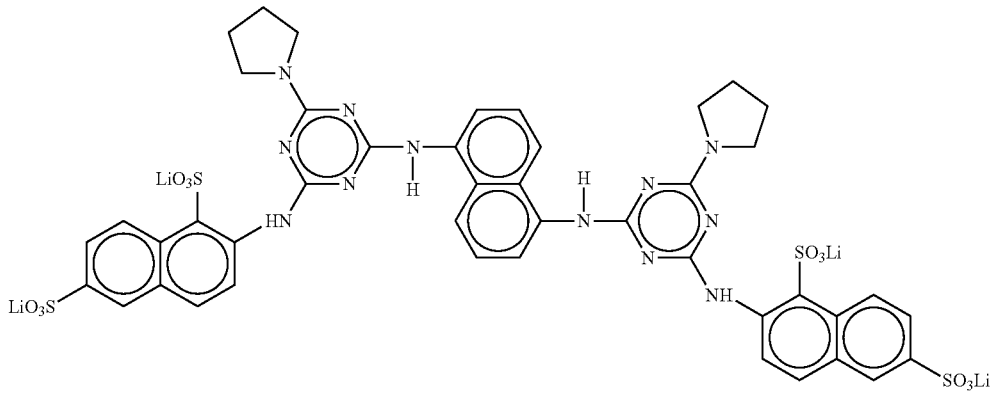
(P-22)
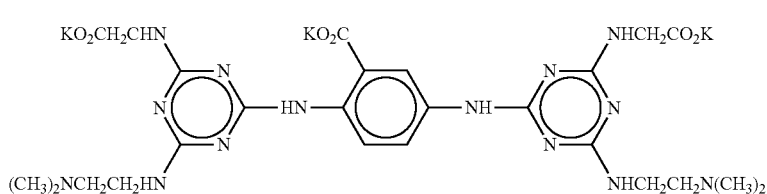
(P-23)
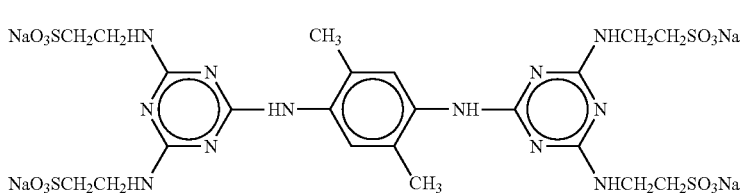
(P-24)
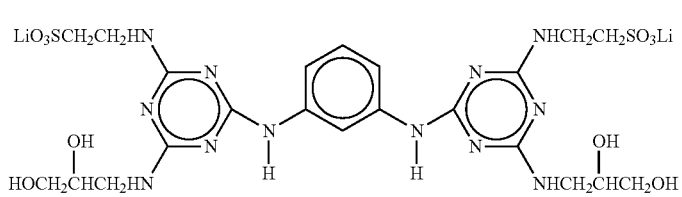
(P-25)
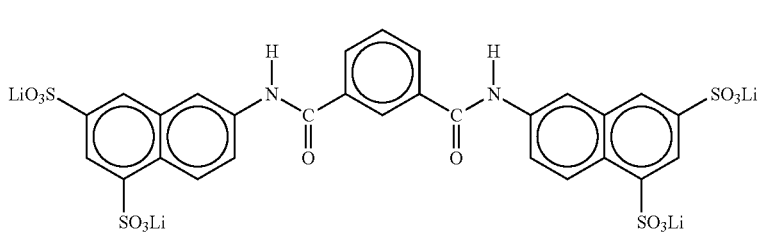
(P-26)
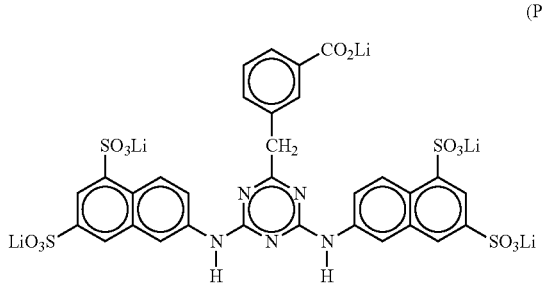
(P-27)
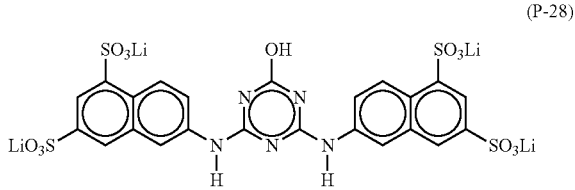
(P-28)

-continued (P-29) 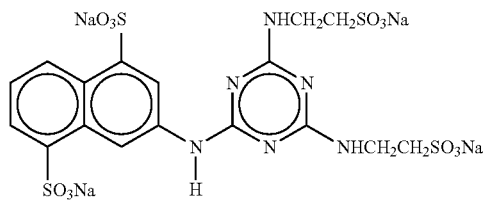

(P-30) 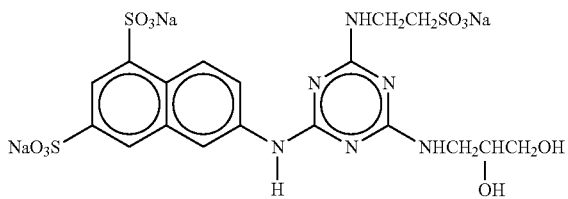

(P-31) 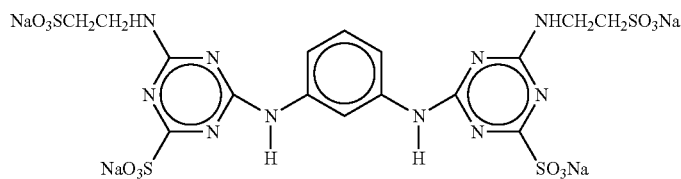

(P-32) 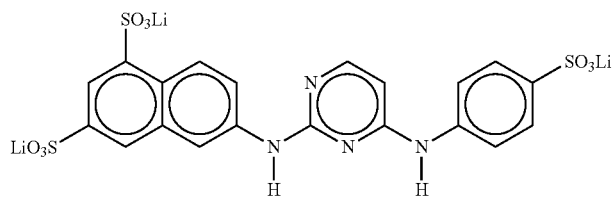

Preferred compounds for use in the present invention can be easily synthesized by referring to, for example, JP-A-2002-139822, supra.

The intended end-usage of the ink composition of the present invention includes an image recording material for forming an image, particularly, a color image. Specific examples thereof include an inkjet recording material which is described in detail later, a heat-sensitive recording material, a pressure-sensitive recording material, a recording material for use with an electrophotographic system, a transfer-type silver halide light-sensitive material, a printing ink and a recording pen. Among these, preferred are an inkjet recording material, a heat-sensitive recording material and a recording material for use with an electrophotographic system, more preferred is an inkjet recording material.

The ink composition of the present invention may also be applied to a dyeing solution for dyeing a color filter used to record/reproduce a color image in a solid-state image sensor (e.g., CCD) or a display (e.g., LCD, PDP), or various fibers.

[Ink]

The ink composition of the present invention means an ink composition comprising at least one colorant of the present invention, water, a guanidine-based compound, and a colorless water-soluble planer compound having more than ten delocalized π-electrons within one molecule.

The ink composition of the present invention may contain a medium and when the medium used is a solvent, the ink composition is suitable particularly as an inkjet recording ink.

The ink composition of the present invention can be produced by using a lipophilic medium or an aqueous medium as the medium and dissolving and/or dispersing the colorant of the present invention therein.

An aqueous medium is preferred, and a water-soluble ink composition is preferred.

The ink of the present invention may contain, if desired, other additives within the range of not impairing the effects of the present invention.

Examples of other additives include known additives (described in JP-A-2003-306623) such as drying inhibitor (wetting agent), discoloration inhibitor, emulsification stabilizer, penetration accelerator, ultraviolet absorbent, antiseptic, fungicide, pH adjusting agent, surface tension adjusting agent, defoaming agent, viscosity adjusting agent, dispersant, dispersion stabilizer, rust inhibitor and chelating agent.

In the case of a water-soluble ink, these various additives are added directly to the ink solution. In the case of using an oil-soluble dye in the form of a dispersion, the additives are generally added to the dispersion after the preparation of a dye dispersion but may be added to the oil or aqueous phase during the preparation.

The drying inhibitor is suitably used for the purpose of preventing clogging due to drying of the inkjet ink at the ink ejection port of a nozzle in the inkjet recording system.

The drying inhibitor is preferably a water-soluble organic solvent having a vapor pressure lower than water. Specific examples thereof include polyhydric alcohols as represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl)ether and triethylene glycol monoethyl(or butyl)ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. In the ink, the drying inhibitor is preferably contained in an amount of 10 to 50 mass %.

The penetration accelerator is suitably used for the purpose of more successfully penetrating the inkjet recording ink into paper. Examples of the penetration accelerator which can be used include alcohols such as ethanol, isopropanol, butanol, di(tri)ethylene glycol monobutyl ether and 1,2-hexanediol, sodium laurylsulfate, sodium oleate and nonionic surfactants. A sufficiently high effect can be usually obtained by adding from 5 to 30 mass % of the penetration accelerator in the ink. The penetration accelerator is preferably used in an amount of causing no blurring of printed letter or no print through.

The ultraviolet absorbent is used for the purpose of enhancing the preservability of image. Examples of the ultraviolet absorbent which can be used include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-based compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in Research Disclosure No. 24239, and compounds of absorbing ultraviolet light and emitting fluorescent light, so-called fluorescent brightening agents, as represented by a stilbene-based compound and a benzoxazole-based compound.

The discoloration inhibitor is used for the purpose of enhancing the preservability of image. As the discoloration inhibitor, various organic or metal complex-based discoloration inhibitors can be used. Examples of the organic discoloration inhibitor include hydroquinones, alkoxyphenols, dialkoxyphenols, phenols, anilines, amines, indanes, chromans, alkoxyanilines and hetero rings. Examples of the metal complex include a nickel complex and a zinc complex. More specifically, compounds described in patents cited in Research Disclosure, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

Examples of the fungicide include sodium dehydroacetate, sodium benzoate, sodium pyridinethione-1-oxide, ethyl p-hydroxybenzoate, 1,2-benzisothiazolin-3-one and salts thereof. In the ink, the fungicide is preferably used in an amount of 0.02 to 1.00 mass %.

As the pH adjusting agent, a neutralizer (e.g., organic base, inorganic alkali) described above may be used. The pH adjusting agent is used for the purpose of enhancing the storage stability of the inkjet recording ink. The pH adjusting agent is preferably added so that the inkjet recording ink can be used in summer, that is, can have a pH of 6 to 10, more preferably a pH of 7 to 10.

Examples of the surface tension adjusting agent include nonionic, cationic and anionic surfactants. The surface tension of the inkjet recording ink of the present invention is preferably from 25 to 70 mPa·s, more preferably from 25 to 60 mPa·s. Also, the viscosity of the inkjet recording ink of the present invention is preferably 30 mPa·s or less. The viscosity is more preferably adjusted to 20 mPa·s or less.

Preferred examples of the surfactant include an anionic surfactant such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylenealkylsulfuric ester salt, and a nonionic surfactant such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer.

Also, SURFYNOLS (produced by Air Products & Chemicals), which are an acetylene-based polyoxyethylene oxide surfactant, may be preferably used. Furthermore, an amine oxide-type amphoteric surfactant such as N,N-dimethyl-N-alkylamine oxide is also preferred. In addition, those described as the surfactant in JP-A-59-157636 (pages (37) to (38)) and Research Disclosure, No. 308119 (1989) may also be used.

A defoaming agent such as fluorine- or silicone-base compound or chelating agent as represented by EDTA may be also used, if desired.

In the case of dispersing the colorant for use in the present invention in an aqueous medium, it is preferred that a colored fine particle containing a coloring matter and an oil-soluble polymer is dispersed in an aqueous medium as described in JP-A-11-286637, JP-A-2001-240763, JP-A-2001-262039 and JP-A-2001-247788, or the colorant of the present invention dissolved in a high-boiling point organic solvent is dispersed in an aqueous medium as described in JP-A-2001-262018, JP-A-2001-240763, JP-A-2001-335734 and JP-A-2002-80772.

As regards the specific method for dispersing the colorant of the present invention in an aqueous medium, the oil-soluble polymer, high-boiling point organic solvent and additives used, and the amounts thereof, those described in the patent publications above may be preferably employed. Alternatively, the colorant in the solid form may be directly dispersed into a fine particle state.

At the time of dispersing the colorant, a dispersant and a surfactant may be used. As for the dispersing device, a simple stirrer or impeller stirring system, an inline stirring system, a mill system (e.g., colloid mill, ball mill, sand mill, attritor, roll mill, agitator mill), an ultrasonic wave system, and a high-pressure emulsion dispersion system (a high-pressure homogenizer; specific examples of the commercially available device include a Gaulin homogenizer, Microfluidizer and DeBEE 2000) may be employed.

Details of the preparation process of the inkjet recording ink are described, other than the patent publications above, in JP-A-5-148436, JP-A-5-295312, JP-A-7-97541, JP-A-7-82515, JP-A-7-118584, JP-A-11-286637 and JP-A-2001-271003, and these can be utilized also in the preparation of the inkjet recording ink of the present invention.

The aqueous medium mainly comprises water and if desired, a mixture where a water-miscible organic solvent is added can be used. Examples of the water-miscible organic solvent include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents may be used in combination of two or more thereof.

In the inkjet recording ink of the present invention, the colorant is preferably contained in an amount of 0.1 to 10 parts by mass per 100 parts by mass of the inkjet recording ink.

In the inkjet recording ink of the present invention, another coloring agent may be used in combination with the colorant of the present invention represented by formula (I) or (II).

In the case of using two or more colorants in combination, the total content of colorants is preferably in the above-described range.

The inkjet recording ink of the present invention can be used not only for the formation of a monochromatic image but also for the formation of a full color image.

For forming a full color image, a magenta color tone ink, a cyan color tone ink and a yellow color tone ink can be used. Also, for adjusting the color tone, a black color tone ink may be further used.

In these inks, other coloring materials (dye or pigment) may also be used in addition to the colorant according to the present invention so as to enhance the image reproducing performance.

The yellow dye which can be used together with the colorant of the present invention may be an arbitrary yellow dye. Examples thereof include an aryl- or heteryl-azo dye having phenols, naphthols, anilines, hetero rings (e.g., pyrazolone, pyridone), open chain-type active methylene compounds or the like as the coupling component (hereinafter referred to as a "coupler component"); an azomethine dye having open chain-type active methylene compounds or the like as the coupler component; a methine dye such as benzylidene dye and monomethine oxonol dye; and a quinone-based dye such as naphthoquinone dye and anthraquinone dye. Other examples of the dye species include a quinophthalone dye, a nitro.nitroso dye, an acridine dye and an acridinone dye.

The magenta dye which can be used may be an arbitrary magenta dye. Examples thereof include an aryl- or heteryl-azo dye having phenols, naphthols, anilines or the like as the coupler component; an azomethine dye having pyrazolones, pyrazolotriazoles or the like as the coupler component; a methine dye such as arylidene dye, styryl dye, merocyanine dye, cyanine dye and oxonol dye; a carbonium dye such as diphenylmethane dye, triphenylmethane dye and xanthene dye; a quinone dye such as naphthoquinone, anthraquinone and anthrapyridone; and a condensed polycyclic dye such as dioxazine dye.

The cyan dye which can be used may be an arbitrary cyan dye. Examples thereof include an aryl- or heteryl-azo dye having phenols, naphthols, anilines or the like as the coupler component; an azomethine dye having phenols, naphthols, hetero rings (e.g., pyrrolotriazole) or the like as the coupler component; a polymethine dye such as cyanine dye, oxonol dye and merocyanine dye; a carbonium dye such as diphenylmethane dye, triphenylmethane dye and xanthene dye; a phthalocyanine dye; an anthraquinone dye; and an indigo.thioindigo dye.

These dyes may be a dye which provides a yellow, magenta or cyan color for the first time when a part of the chromophore is dissociated. In this case, the counter cation may be an inorganic cation such as alkali metal and ammonium, an organic cation such as pyridinium and quaternary ammonium salt, or a polymer cation having such a cation in a partial structure.

Examples of the black coloring material which can be used include dis-azo, tris-azo and tetra-azo dyes and a dispersion of carbon black.

[Inkjet Recording Method]

In the inkjet recording method of the present invention, an energy is supplied to the above-described inkjet recording ink and thereby an image is formed on a known image-receiving material, namely, plain paper, resin coated paper, inkjet special paper described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, electrophotographic common paper, cloth, glass, metal, ceramic or the like.

At the formation of an image, a polymer latex compound may be used in combination for the purpose of giving glossiness or water resistance or improving the weather resistance.

The timing of imparting the latex compound to the image-receiving material may be before, after or simultaneous with the addition of the colorant. Accordingly, the site to which the polymer latex is added may be in the image-receiving paper or ink, or a liquid material of the polymer latex alone may be prepared and used. More specifically, the methods described in JP-A-2002-166638, JP-A-2002-121440, JP-A-2002-154201, JP-A-2002-144696, JP-A-2002-80759, JP-A-2002-187342 and JP-A-2002-172774 may be preferably used.

The recording paper and recording film which are used in performing the inkjet printing by using the ink of the present invention are described below.

The support which can be used for the recording paper or film is produced, for example, from a chemical pulp such as LBKP and NBKP, a mechanical pulp such as GP, PGW, RMP, TMP, CTMP, CMP and CGP, or a waste paper pulp such as DIP, by mixing, if desired, conventionally known additives such as pigment, binder, sizing agent, fixing agent, cation agent and paper strength increasing agent, and then sheeting the mixture by using various devices such as Fourdrinier paper machine and cylinder paper machine. Other than these supports, synthetic paper or plastic film may be used. The thickness of the support is preferably from 10 to 250 µm, and the basis weight is preferably from 10 to 250 g/m². An ink-receiving layer and a backcoat layer may be provided on the support as it is or after providing a size press or anchor coat layer by using starch, polyvinyl alcohol or the like, an ink-receiving layer and a backcoat layer may be provided. The support may be further subjected to a flattening treatment by a calendering device such as machine calender, TG calender and soft calender. The support for use in the present invention is preferably paper or plastic film of which both surfaces are laminated with a polyolefin (for example, polyethylene, polystyrene, polyethylene terephthalate, polybutene or a copolymer thereof). In the polyolefin, a white pigment (e.g., titanium oxide, zinc oxide) or a tinting dye (e.g., cobalt blue, ultramarine, neodymium oxide) is preferably added.

The ink-receiving layer provided on the support contains a pigment and an aqueous binder. The pigment is preferably a white pigment. Examples of the white pigment include an inorganic white pigment such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and an organic pigment such as styrene-based pigment, acryl-based pigment, urea resin and melamine resin. The white pigment contained in the ink-receiving layer is preferably a porous inorganic pigment, more preferably a synthetic amorphous silica or the like having a large pore area. The synthetic amorphous silica may be either a silicic acid anhydride obtained by a dry production process or a silicic acid hydrate obtained by a wet production process but is preferably a silicic acid hydrate.

Examples of the aqueous binder contained in the ink-receiving layer include a water-soluble polymer such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivative, and a water-dispersible polymer such as styrene butadiene latex and acryl emulsion. These aqueous binders may be used individually or in combination of two or more thereof. Among these, polyvinyl alcohol and silanol-modified polyvinyl alcohol are preferred in the present invention in view of adhesion to the pigment and separation resistance of the ink-receiving layer.

The ink-receiving layer may contain a mordant, a water-proofing agent, a light fastness enhancer, a surfactant and other additives in addition to the pigment and the aqueous binder.

The mordant added to the ink-receiving layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent image quality can be obtained and at the same time, light fastness of the image is improved.

The water-proofing agent is effective for forming a water-resistant image. The water-proofing agent is preferably a cationic resin. Examples of the cationic resin include polyamidopolyamine epichlorohydrin, polyethyleneimine, polyaminesulfone, poly-dimethyldiallylammonium chloride, cation polyacrylamide and colloidal silica. Among these cationic resins, polyamidopolyamine epichlorohydrin is preferred. The cationic resin content is preferably from 1 to 15 mass %, more preferably from 3 to 10 mass %, based on the entire solid content of the ink-receiving layer.

Examples of the light fastness enhancer include zinc sulfate, zinc oxide, a hindered amine-based antioxidant and a benzophenone-based or benzotriazole-based ultraviolet absorbent. Among these, zinc sulfate is preferred.

The surfactant functions as a coating aid, a releasability improver, a slipperiness improver or an antistatic agent. The surfactant is described in JP-A-62-173463 and JP-A-62-183457. In place of the surfactant, an organofluoro compound may be used. The organofluoro compound is preferably hydrophobic. Examples of the organofluoro compound include a fluorine-containing surfactant, an oily fluorine-base compound (for example, fluorine oil) and a solid fluorine compound resin (for example, ethylene tetrafluoride resin). The organofluoro compound is described in JP-B-57-9053 (columns 8 to 17), JP-A-61-20994 and JP-A-62-135826. Other examples of the additive added to the ink-receiving layer include a pigment dispersant, a thickener, a defoaming agent, a coloring matter, a fluorescent brightening agent, an antiseptic, a pH adjusting agent, a matting agent and a hardening agent. The ink-receiving layer may be composed of either one layer or two layers.

In the recording paper or film, a backcoat layer may also be provided. The component which can be added to this layer includes a white pigment, an aqueous binder and other components. Examples of the white pigment contained in the backcoat layer include an inorganic white pigment such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and an organic pigment such as styrene-based plastic pigment, acryl-based plastic pigment, polyethylene, microcapsule, urea resin and melamine resin.

Examples of the aqueous binder contained in the backcoat layer include a water-soluble polymer such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and a water-dispersible polymer such as styrene butadiene latex and acryl emulsion. Other examples of the component contained in the backcoat layer include a defoaming agent, a foam inhibitor, a coloring matter, a fluorescent brightening agent, an antiseptic and a water-proofing agent.

A polymer latex may be added to a constituent layer (including the backcoat layer) of the inkjet recording paper or film.

The polymer latex is used for the purpose of improving film physical properties, for example, stabilizing the dimension and preventing the curling, adhesion or film cracking. The polymer latex is described in JP-A-62-245258, JP-A-62-1316648 and JP-A-62-110066. When a polymer latex having a low glass transition temperature (40° C. or less) is added to a layer containing a mordant, the layer can be prevented from cracking or curling. The curling can also be prevented by adding a polymer latex having a high glass transition temperature to the backcoat layer.

The ink of the present invention is not limited in the inkjet recording system and is used for a known system, for example, a charge controlling system of jetting out the ink by using an electrostatic induction force, a drop-on-demand system (pressure pulse system) utilizing a vibration pressure of a piezoelectric element, an acoustic inkjet system of converting an electric signal into an acoustic beam, irradiating the beam on the ink and jetting out the ink by using the radiation pressure, and a thermal inkjet system of heating the ink to form a bubble and utilizing the pressure generated. The inkjet recording system includes a system of ejecting a large number of small-volume ink droplets of a so-called photo-ink having a low concentration, a system of improving the image quality by using a plurality of inks having substantially the same color hue but differing in the concentration, and a system of using a colorless transparent ink.

Embodiment

The present invention is described in greater detail below by referring to Examples, but the present invention is not limited thereto.

(Ink C-1)

Ultrapure water having a resistance value of 18 MΩ or more is added to the following components to make 100 g, and the resulting solution is stirred for 1 hour under heating at 30 to 40° C. Thereafter, the solution is filtered under reduced pressure through a microfilter having an average pore size of 0.25 μm to prepare Cyan Ink Solution (C-1).

| C-1: | |
|---|---|
| Dye 102 | 4.7 g |
| Urea | 2.4 g |
| Triethylene glycol | 10.7 g |
| Triethylene glycol monobutyl ether | 9.1 g |
| 1,2-Hexanediol | 2.4 g |
| 2-Pyrrolidone | 3.5 g |
| Glycerin | 11.8 g |
| Triethanolamine | 0.5 g |
| Proxel XL II | 1.0 g |
| Olfin E1010 | 1.0 g |

Comparative Coloring Matter a:

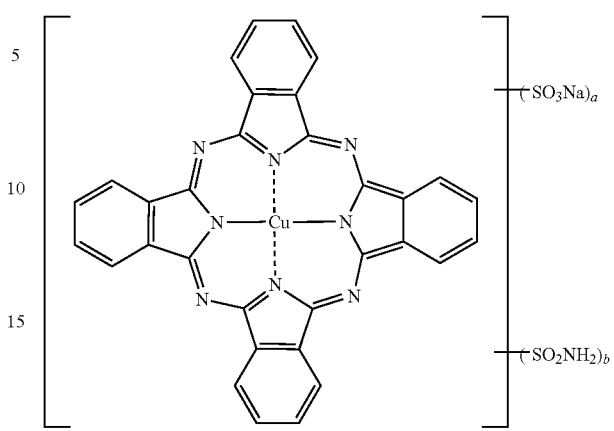

α, β-Mixed Type a + b = about 3 to 4

(Ink C-6)

Ink C-6 is prepared in the same manner as Ink C-4 except for replacing Dye 102 in Ink C-4 with Comparative Coloring Matter b.

Comparative Coloring Matter b:

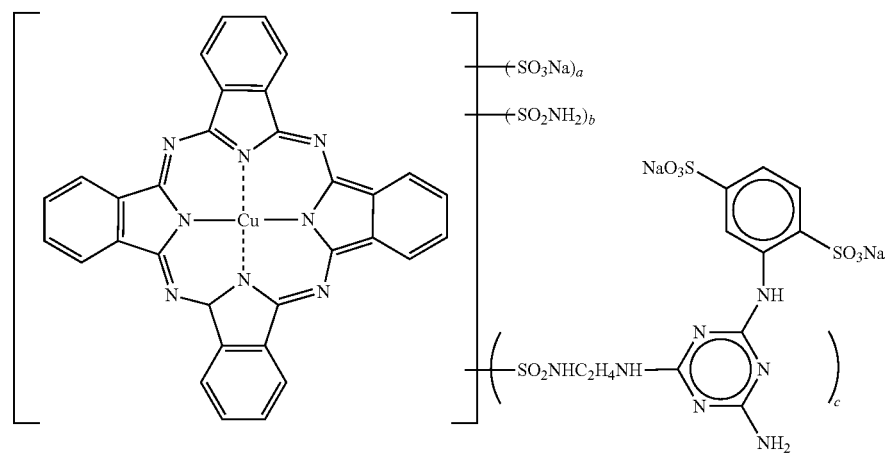

α,β-Mixed Type a + b + c = about 3 to 4

(Ink C-2)

Ink C-2 is prepared in the same manner as Ink C-1 except for replacing 5.7 g of water in Ink C-1 with 5.7 g of a 17.5 wt % aqueous solution of Compound P-3.

(Ink C-3)

Ink C-3 is prepared in the same manner as Ink C-1 except for replacing 1.0 g of water in Ink C-1 with 1.0 g of aminoguanidine hydrochloride.

(Ink C-4)

Ink C-4 is prepared in the same manner as Ink C-1 except for replacing 6.7 g of water in Ink C-1 with 5.7 g of a 17.5 wt % aqueous solution of Compound P-3 and 1.0 g of aminoguanidine hydrochloride.

(Ink C-5)

Ink C-5 is prepared in the same manner as Ink C-4 except for replacing Dye 102 in Ink C-4 with Comparative Coloring Matter a.

(Ink C-7)

Ink C-7 is prepared in the same manner as Ink C-4 except for replacing 1.0 g of aminoguanidine hydrochloride in Ink C-4 with 1.0 g of guanidine hydrochloride.

(Ink C-8)

Ink C-8 is prepared in the same manner as Ink C-4 except for replacing 1.0 g of aminoguanidine hydrochloride in Ink C-4 with N,N'-diaminoguanidine.

(Ink C-9)

Ink C-9 is prepared in the same manner as Ink C-1 except for replacing 7.7 g of water in Ink C-1 with 5.7 g of a 17.5 wt % aqueous solution of Compound P-3 and 2.0 g of aminoguanidine hydrochloride and replacing Dye 102 with Dye 101.

(Ink C-10)

Ink C-10 is prepared in the same manner as Ink C-1 except for replacing 12.4 g of water in Ink C-1 with 11.4 g of a 17.5 wt % aqueous solution of Compound P-3 and 1.0 g of aminoguanidine hydrochloride and replacing Dye 102 with Dye 101.

(Inkjet Recording)

Inks C-1 to C-10 prepared above each is filled in a cyan ink cartridge of an inkjet printer, PM-A-700, manufactured by Seiko Epson Corp., and an image is printed on photographic paper, Crispia <KO-KOTAKU>, produced by Seiko Epson Corp. and subjected to various evaluations.

(Evaluation of Ozone Resistance)

A monochromatic step patch image is printed. When 24 hours is passed after printing of this step patch image, the reflection density (Ci) in each concentration region of the step patch portion is measured using an X-rite 310 densitometer including a Status A Filter as standard equipment. Subsequently, a discoloration test is performed by storing this sample in an ozone fadeometer at an ozone concentration of 10 ppm for 21 days. A commercially available apparatus of high-pressure charging type, to which an AC voltage of 5 kV is applied, is used as the ozonizer, and the ozone gas concentration is set and controlled using an ozone gas monitor (Model OZG-EM-01) manufactured by APPLICS.

After storage for 21 days, the image density is again measured to determine the density (Cf) after storage, and the residual coloring matter ratio [%]=(Cf/Ci)×100 is obtained to evaluate the ozone resistance. A value at a reflection density Ci of 0.9 to 1.1 is employed as the residual coloring matter ratio.

The samples are rated on a five-stage scale, namely, rated A when the residual coloring matter ratio is 95% or more, rated B when from 90% to less than 95%, rated C when from 85% to less than 90%, rated D when from 80% to less than 85%, and rated E when less than 80%.

(Generation of Bronze Gloss)

The cyan Dmax part after printing in an environment of 30° C. and 80% RH is observed with an eye to confirm whether bronze is generated or not.

TABLE 6

| | Ozone Resistance | Bronze |
|---|---|---|
| Ink C-1 (Comparative Example) | C | generated |
| Ink C-2 (Comparative Example) | C | none |
| Ink C-3 (Comparative Example) | B | generated |
| Ink C-4 (Invention) | A | none |
| Ink C-5 (Comparative Example) | E | none |
| Ink C-6 (Comparative Example) | E | none |
| Ink C-7 (Invention) | A | none |
| Ink C-8 (Invention) | A | none |
| Ink C-9 (Invention) | A | none |
| Ink C-10 (Invention) | A | none |

Even when the image-receiving paper for use in the present invention is changed to Inkjet Photo Gloss Paper "GASAI" produced by Fuji Photo Film Co., Ltd. or PR101 produced by Canon Inc., the same effects as in the results above are obtained.

INDUSTRIAL APPLICABILITY

According to the present invention, an inkjet recording ink capable of forming a color image excellent in the color reproduction, assured of sufficiently high fastness to light, heat, humidity and active gas in the environment and free from occurrence of a bronze phenomenon can be provided. Furthermore, an inkjet recording method satisfying both the improvement of bronze phenomenon of the recorded image and the improvement of preservability of the recorded image at the same time in a high improvement level, and a method for preventing the occurrence of a bronze phenomenon of an image and improving the preservability of an image can be provided.

The entire disclosure of each and every foreign patent application from which the benefit of foreign priority has been claimed in the present application is incorporated herein by reference, as if fully set forth.

The invention claimed is:

1. An ink composition comprising:
a colorant represented by the following formula (I);
water;
a guanidine-based compound; and
a colorless water-soluble planar compound having more than ten delocalized π-electrons within one molecule:

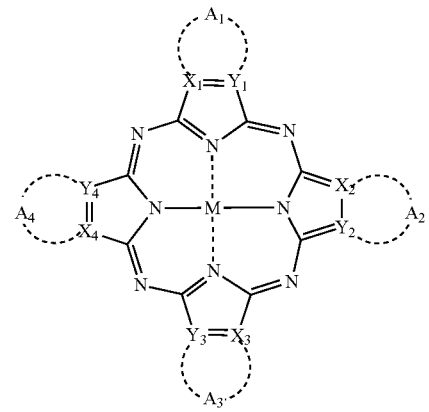

Formula (I)

wherein
each of $X_m$ (m=1, 2, 3, 4) represents a carbon atom or a nitrogen atom;
each of $Y_m$ (m=1, 2, 3, 4) represents a carbon atom or a nitrogen atom;
each of $A_m$ (m=1, 2, 3, 4) represents a group necessary for forming, together with $X_m$ and $Y_m$, either an aromatic hydrocarbon ring which may further form a condensed ring with another ring or a hetero ring which may further form a condensed ring with another ring;
each of $A_m$ may have a substituent;
each of the substituents of $A_m$ may further have a substituent;
at least one of the substituents of $A_m$ and the substituents of the substituents of $A_m$ is ionic hydrophilic group; and
M represents a hydrogen atom, a metal element, a metal oxide, a metal hydroxide or a metal halide, provided that the following conditions are satisfied:
(i) at least one of the four rings, each of which comprises respective $A_m$, $X_m$ and $Y_m$, is a hetero ring;
(ii) when all of the four rings, each of which comprises respective $A_m$, $X_m$ and $Y_m$, are a pyridine ring, both of atoms adjacent to $X_m$ and $Y_m$ in each pyridine ring are a carbon atom; and
(iii) when all of the four rings, each of which comprises respective $A_m$, $X_m$ and $Y_m$, are a pyrazine ring, both of atoms adjacent to $X_m$ and $Y_m$ in each pyrazine ring are a carbon atom.

2. The ink composition according to claim 1, wherein the colorant represented by the formula (I) is represented by the following formula (II):

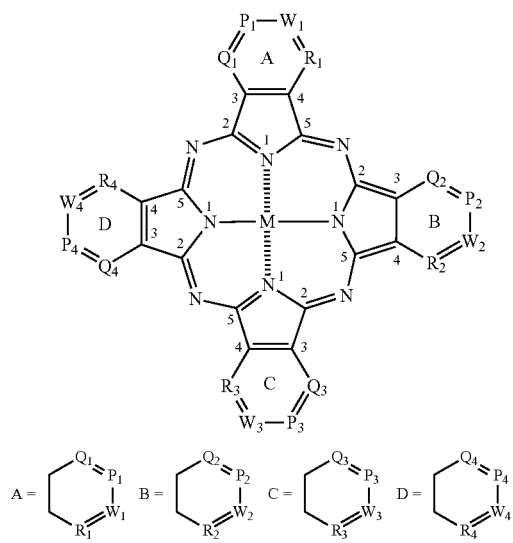

Formula (II)

wherein
each of $Q_m$ (m=1, 2, 3, 4) represents $=C(J_1)-$ or $-N=$;
each of $P_m$ (m=1, 2, 3, 4) represents $=C(J_2)-$ or $-N=$;
each of $W_m$ (m=1, 2, 3, 4) represents $=C(J_3)-$ or $-N=$;
each of $R_m$ (m=1, 2, 3, 4) represents $=C(J_4)-$ or $-N=$;
each of $J_n$ (n=1, 2, 3, 4) represents a hydrogen atom or a substituent, and when each of $J_n$ represents a substituent, each of $J_n$ may further have a substituent;
at least one of $J_n$ and the substituents of $J_n$ is an ionic hydrophilic group; and
M represents a hydrogen atom, a metal element, a metal oxide, a metal hydroxide or a metal halide,
provided that the following conditions are satisfied:
(i) at least one of the four rings (A), (B), (C) and (D), in which the ring (A) comprises $Q_1, P_1, W_1$ and $R_1$, the ring (B) comprises $Q_2, P_2, W_2$ and $R_2$, the ring (C) comprises $Q_3, P_3, W_3$ and $R_3$, and the ring (D) comprises $Q_4, P_4, W_4$ and $R_4$, is a hetero ring;
(ii) when all of the four rings (A), (B), (C) and (D) are a pyridine ring, both of $Q_m$ and $R_m$ in each pyridine ring are a carbon atom; and
(iii) at least one of the four rings (A), (B), (C) and (D) is not a pyrazine ring.

3. The ink composition according to claim 2, wherein
at least one of the four rings (A), (B), (C) and (D) represents an aromatic hydro-carbon ring; and
at least one of the four rings (A), (B), (C) and (D) represents a pyridine ring or a pyrazine ring.

4. The ink composition according to claim 2, wherein at least one of the four rings (A), (B), (C) and (D) represents an aromatic hydro-carbon ring represented by the following formula (IV):

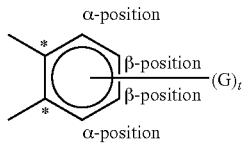

Formula (IV)

wherein
* represents a position at which the ring is bonded to the 3- and 4-positions of the 5-membered nitrogen-containing ring to form the phthalocyanine structure;
the position closer to * in the aromatic hydrocarbon ring is called α-position;
the position farther from * in the aromatic hydrocarbon ring is called n-position;
the position to which G(s) is substituted is not specified as either the α-position or the β-position;
each of G(s) represents a substituent selected from the group consisting of —SO—Z, —SO$_2$—Z, —SO$_2$NV$_1$V$_2$, —CONV$_1$V$_2$, —CO$_2$Z, —COZ, a sulfo group and a salt thereof, a carboxyl group and a salt thereof, and a phosphono group and a salt thereof;
t represents an integer of 1 to 4;
Z(s) may be the same as or different from each other, and each of Z(s) represents a substituted or unsubstituted alkyl group having a total carbon number of 1 to 20, a substituted or unsubstituted cycloalkyl group having a total carbon number of 3 to 20, a substituted or unsubstituted alkenyl group having a total carbon number of 2 to 20, a substituted or unsubstituted alkynyl group having a total carbon number of 2 to 12, a substituted or unsubstituted aryl group having a total carbon number of 6 to 20, or a substituted or unsubstituted heterocyclic group having a total carbon number of 4 to 20;
$V_1$(s) may be the same as or different from each other, and each of $V_1$(s) represents a hydrogen atom, a substituted or unsubstituted alkyl group having a total carbon number of 1 to 20, a substituted or unsubstituted cycloalkyl group having a total carbon number of 3 to 20, a substituted or unsubstituted alkenyl group having a total carbon number of 2 to 20, a substituted or unsubstituted alkynyl group having a total carbon number of 2 to 12, a substituted or unsubstituted aralkyl group having a total carbon number of 7 to 20, a substituted or unsubstituted aryl group having a total carbon number of 6 to 20, or a substituted or unsubstituted heterocyclic group having a total carbon number of 4 to 20; and
$V_2$(s) may be the same as or different from each other, and each of $V_2$(s) represents a hydrogen atom, a substituted or unsubstituted alkyl group having a total carbon number of 1 to 20, a substituted or unsubstituted cycloalkyl group having a total carbon number of 3 to 20, a substituted or unsubstituted alkenyl group having a total carbon number of 2 to 20, a substituted or unsubstituted alkynyl group having a total carbon number of 2 to 12, a substituted or unsubstituted aralkyl group having a total carbon number of 7 to 20, a substituted or unsubstituted aryl group having a total carbon number of 6 to 20, or a substituted or unsubstituted heterocyclic group having a total carbon number of 4 to 20.

5. The ink composition according to claim 3, wherein at least one of the four rings (A), (B), (C) and (D) represents an aromatic hydro-carbon ring represented by the following formula (V):

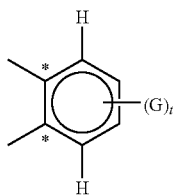

Formula (V)

wherein
G(s) has the same meaning as in the formula (IV);
t represents an integer of 0 to 2; and
* represents a position at which the ring is bonded to the 3- and 4-positions of the 5-membered nitrogen-containing ring to form the phthalocyanine structure.

6. The ink composition according to claim 5, wherein at least one of the four rings (A), (B), (C) and (D) represents an aromatic hydro-carbon ring represented by the formula (V); and
at least one of the four rings (A), (B), (C) and (D) represents a pyridine ring.

7. The ink composition according to claim 6, wherein at least one of the four rings (A), (B), (C) and (D) represents an aromatic hydro-carbon ring represented by the formula (V); and
at least one of the four rings (A), (B), (C) and (D) represents a pyridine ring represented by formula (VI):

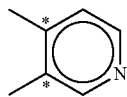

Formula (VI)

wherein
* represents a position at which the ring is bonded to the 3- and 4-positions of the 5-membered nitrogen-containing ring to form the phthalocyanine structure.

8. The ink composition according to claim 7, wherein at least one of the four rings (A), (B), (C) and (D) represents an aromatic hydro-carbon ring represented by the following formula (VII); and
at least one of the four rings (A), (B), (C) and (D) represents a pyridine ring represented by the formula (VI):

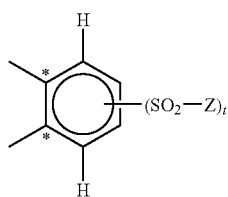

Formula (VII)

wherein
G(s) has the same meaning as in the formula (IV);
t represents an integer of 0 to 2; and
* represents a position at which the ring is bonded to the 3- and 4-positions of the 5-membered nitrogen-containing ring to form the phthalocyanine structure.

9. The ink composition according to claim 1, wherein the water-soluble planar compound has at least two aromatic rings.

10. The ink composition according to claim 1, wherein the water-soluble planar compound has no fluorescence, and has 350 nm or less of λmax and 10,000 or less of molar absorption coefficient, wherein
λmax represents a wavelength of the absorption peak having the longest wavelength.

11. The ink composition according to claim 1, wherein the water-soluble planar compound has a sulfo group.

12. The ink composition according to claim 1, wherein the guanidine-based compound is represented by the following formula (1):

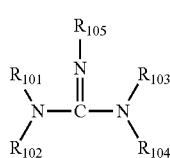

Formula (1)

wherein
$R_{101}$, $R_{102}$, $R_{103}$ and $R_{104}$ each independently represents a hydrogen atom, a substituted or unsubstituted alkyl group, a substituted or unsubstituted alkoxy group, a substituted or unsubstituted aryl group, a substituted or unsubstituted heterocyclic group, or substituted or unsubstituted an amino group; and
$R_{105}$ represents a hydrogen atom, a substituted or unsubstituted alkyl group, a substituted or unsubstituted alkoxy group, a substituted or unsubstituted aryl group, or a substituted or unsubstituted heterocyclic group.

13. The ink composition according to claim 1, wherein the guanidine-based compound is in an amount of 0.1 to 10 mass % based on the ink composition.

14. The ink composition according to claim 1, further comprising:
a surfactant.

15. The ink composition according to claim 14, wherein the surfactant is in an amount of 0.05 to 50 g/liter based on the ink composition.

16. The ink composition according to claim 14, wherein the surfactant is a nonionic surfactant.

17. The ink composition according to claim 16, wherein the nonionic surfactant is an acetylene glycol-based surfactant.

18. The ink composition according to claim 1, further comprising:
an antiseptic.

19. An inkjet recording ink prepared by using utilizing the ink composition according to claim 1.

20. An inkjet recording method utilizing the inkjet recording ink according to claim 19.

* * * * *